United States Patent
Otsuka et al.

(10) Patent No.: US 7,533,192 B2
(45) Date of Patent: May 12, 2009

(54) TASK SCHEDULING METHOD IN CASE OF SIMULTANEOUS TRANSFER OF COMPRESSED DATA AND NON-COMPRESSED DATA

(75) Inventors: Tatsushi Otsuka, Kawasaki (JP); Tetsu Takahashi, Kawasaki (JP)

(73) Assignee: Fujitsu Microelectronics Ltd., Tokyo (JP)

( * ) Notice: Subject to any disclaimer, the term of this patent is extended or adjusted under 35 U.S.C. 154(b) by 402 days.

(21) Appl. No.: 11/073,602

(22) Filed: Mar. 8, 2005

(65) Prior Publication Data

US 2005/0149635 A1    Jul. 7, 2005

Related U.S. Application Data

(63) Continuation of application No. PCT/JP03/04920, filed on Apr. 17, 2003.

(51) Int. Cl.
G06F 3/00      (2006.01)
G06F 13/00     (2006.01)
G06F 5/00      (2006.01)

(52) U.S. Cl. ............................... 710/6; 710/21; 710/29; 710/52; 710/57; 725/86; 725/93; 725/94

(58) Field of Classification Search ............... None
See application file for complete search history.

(56) References Cited

U.S. PATENT DOCUMENTS 5,339,442 A * 8/1994 Lippincott ............... 710/244
5,899,575 A   5/1999 Okayama et al.
6,094,521 A   7/2000 Okayama et al.
6,269,215 B1  7/2001 Okayama et al.
2001/0012272 A1* 8/2001 Aubert et al. ............... 370/230
2001/0043731 A1 11/2001 Ito
2001/0053271 A1 12/2001 Okayama et al.
2002/0010938 A1* 1/2002 Zhang et al. ................. 725/95
2003/0177293 A1* 9/2003 Bilak et al. ................. 710/56

FOREIGN PATENT DOCUMENTS

| JP | 07-274104 A   | 10/1995 |
| JP | 09-128327 A   | 5/1997  |
| JP | 10-285564 A   | 10/1998 |
| JP | 2000-286877 A | 10/2000 |
| JP | 2000-298935 A | 10/2000 |
| JP | 2001-204006 A | 7/2001  |
| JP | 2002-077821 A | 3/2002  |
| JP | 2002-288013 A | 10/2002 |
| JP | 2003-046737 A | 2/2003  |

* cited by examiner

*Primary Examiner*—Tariq R. Hafiz
*Assistant Examiner*—Scott Sun
(74) *Attorney, Agent, or Firm*—Arent Fox LLP.

(57) ABSTRACT

The invention provides a task scheduling method which can prevent overflowing of a buffer on a host system or a data encoding/decoding apparatus even when the transfer rate falls in case the compressed data and the non-compressed data are simultaneously transferred between the host system and the data encoding/decoding apparatus. In a task scheduling method, the compressed audio/video data is transferred from the buffer of the host system to an external device with a first transfer priority. The non-compressed audio/video data is transferred from the buffer to the external device with a second transfer priority lower than the first transfer priority.

13 Claims, 18 Drawing Sheets

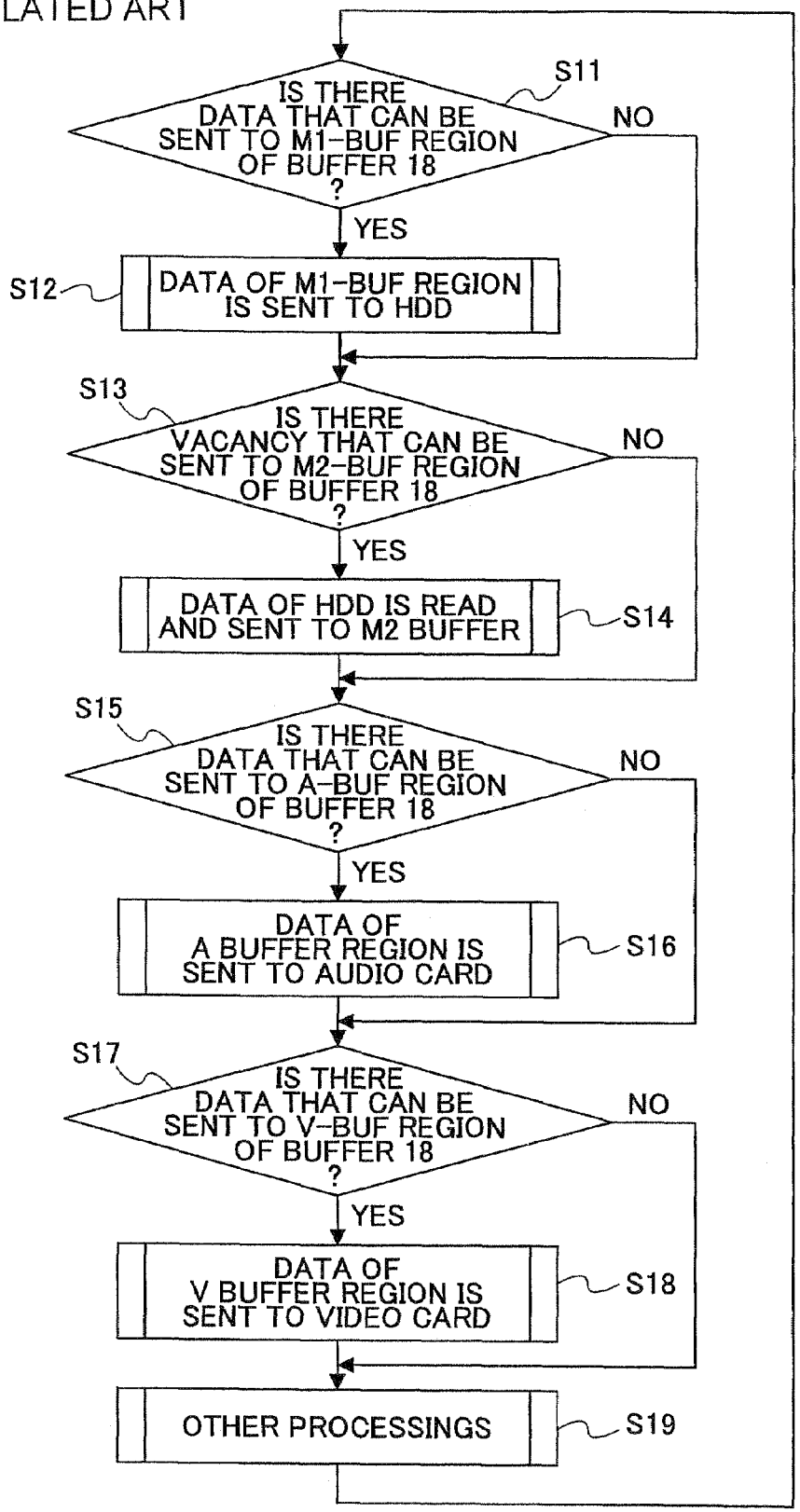

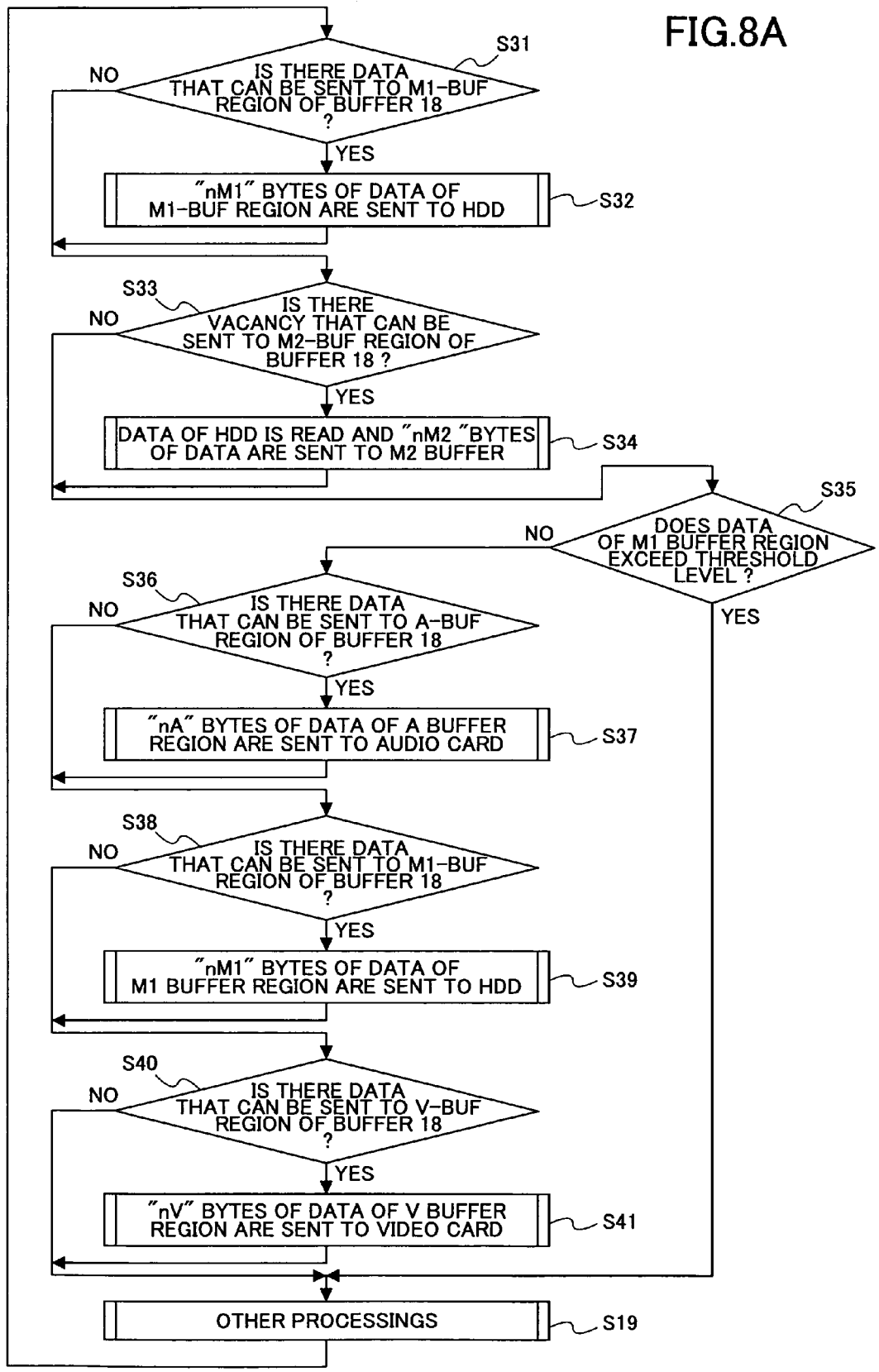

TASK SCHEDULING METHOD IN CASE OF SIMULTANEOUS TRANSFER OF COMPRESSED DATA AND NON-COMPRESSED DATA

CROSS-REFERENCE TO RELATED APPLICATIONS

This application is a U.S. continuation application which is filed under 35 USC 111(a) and claims the benefit under 35 USC 120 and 365(c) of International Application No. PCT/JP2003/004920, filed on Apr. 17, 2003, the entire contents of which are hereby incorporated by reference.

BACKGROUND OF THE INVENTION

1. Field of the Invention

The present invention relates to a task scheduling method in the case of carrying out the simultaneous transfer of compressed audio/video data and non-compressed audio/video data between the host system and the data encoding/decoding apparatus.

2. Description of the Related Art

In the conventional system, when the compressed audio/video data, which is created by the compression coding, and the non-compressed audio/video data which is the data before the compression coding or the de-multiplexed and decoded data, are simultaneously transferred between the host system (PC etc.) and the data encoding/decoding apparatus (MPEG2 PS/TS CODEC etc.), the following four kinds of transfer tasks may be performed simultaneously.

1) The non-compressed video data is transferred from the data encoding/decoding apparatus to the buffer in the main memory of the host system through the bus, such as USB (universal serial bus).

2) The non-compressed audio data is transferred from the data encoding/decoding apparatus to the buffer in the main memory of the host system through the bus, such as USB.

3) The compressed audio/video data (AV stream) is transferred from the data encoding/decoding apparatus to the buffer in the main memory of the host system through the bus, such as USB.

4) The compressed audio/video data is transferred from the buffer in the main memory of the host system to the data encoding/decoding apparatus through the bus, such as USB.

Each transfer task uses the separate end point on the bus, such as USB, and is performed through the bulk transfer, the interrupt transfer or the isochronous transfer.

In the conventional system mentioned above, the operation of the data encoding/decoding apparatus is controlled as follows.

The USB host system outputs the control command of the user definition to the USB device controller using the bulk transfer or the control transfer.

If this control command is received, the USB device controller will control the ASIC circuit, the MPEG2 CODEC, the video encoder/decoder, the audio ADC/DAC, etc. according to the received control command, respectively.

In the following, the compressed audio/video data will be referred to as the compressed data, and the non-compressed audio/video data will be referred to as the non-compressed data, for the sake of convenience of description.

In the above-mentioned conventional system, if the load of the CPU on the host system increases, in the case of simultaneously transferring the compressed data and the non-compressed data between the host system and the data encoding/decoding apparatus, the transfer rate from the buffer of the host system to the exterior may fall, or the transfer rate on the bus, such as USB, may fall.

Thus, if the transfer rate falls excessively, there may be the problem that the buffer on the side of the host system or the buffer on the side of the data encoding/decoding apparatus is subjected to overflowing, and transferring all the information that should be transferred is impossible.

The transferring of the compressed data is mainly aimed at recording the compressed data in the HDD, etc., and decoding it repeatedly for viewing and listening later, and the transferring of the non-compressed data is mainly aimed at viewing and listening in real time.

For this reason, if the load of the CPU on the host system increases significantly to cause the overflowing of the buffer and the loss of the data, the images or voice which the user views and listens in real time are temporarily interrupted with respect to the non-compressed data. Moreover, with respect to the compressed data, the data which should be recorded in the HDD etc. is lost in such a case.

It is the ideal that all the data is not lost. However, in a case where avoiding the problem is difficult in view of the capacity of the system, priority should be given to recording the compressed data in the HDD etc. correctly even if interruption of viewing and listening in real time occurs temporarily.

SUMMARY OF THE INVENTION

An object of the present invention is to provide an improved task scheduling method in which the above-described problems are eliminated.

Another object of the present invention is to provide a task scheduling method which can prevent the overflowing of the compressed data in the buffer on the host system or the data encoding/decoding apparatus, even when the transfer rate falls in the case of simultaneously transferring the compressed data and the non-compressed data between the host system and the data encoding/decoding apparatus.

In order to achieve the above-mentioned object, the present invention provides a task scheduling method in case compressed data and non-compressed data are simultaneously transferred between a host system and a data encoding/decoding apparatus, the task scheduling method comprising the steps of: transferring a compressed audio/video data from a buffer of the host system to an external device with a first transfer priority; and transferring a non-compressed audio/video data from the buffer to the external device with a second transfer priority lower than the first transfer priority.

According to the task scheduling method of the present invention, in the case of transferring the compressed data and the non-compressed data simultaneously, even when the CPU load of the host system increases and the transfer rate falls, the overflowing of the compressed data in the buffer on the host system or the data encoding/decoding apparatus can be prevented. Therefore, it is possible to avoid the problem that the important compressed data which should be recorded in the HDD etc. will be lost due to the fall of the transfer rate.

BRIEF DESCRIPTION OF THE DRAWINGS

Other objects, features and advantages of the present invention will be apparent from the following detailed description when read in conjunction with the accompanying drawings.

FIG. 6A is a flowchart for explaining an example of the procedure of transferring the compressed data and the non-compressed data with the same transfer priority.

FIG. 8A is a flowchart for explaining other embodiments of the task scheduling method of the present invention.

DETAILED DESCRIPTION OF PREFERRED EMBODIMENTS

A description will now be given of the preferred embodiments of the invention with reference to the accompanying drawings.

Figure 1:
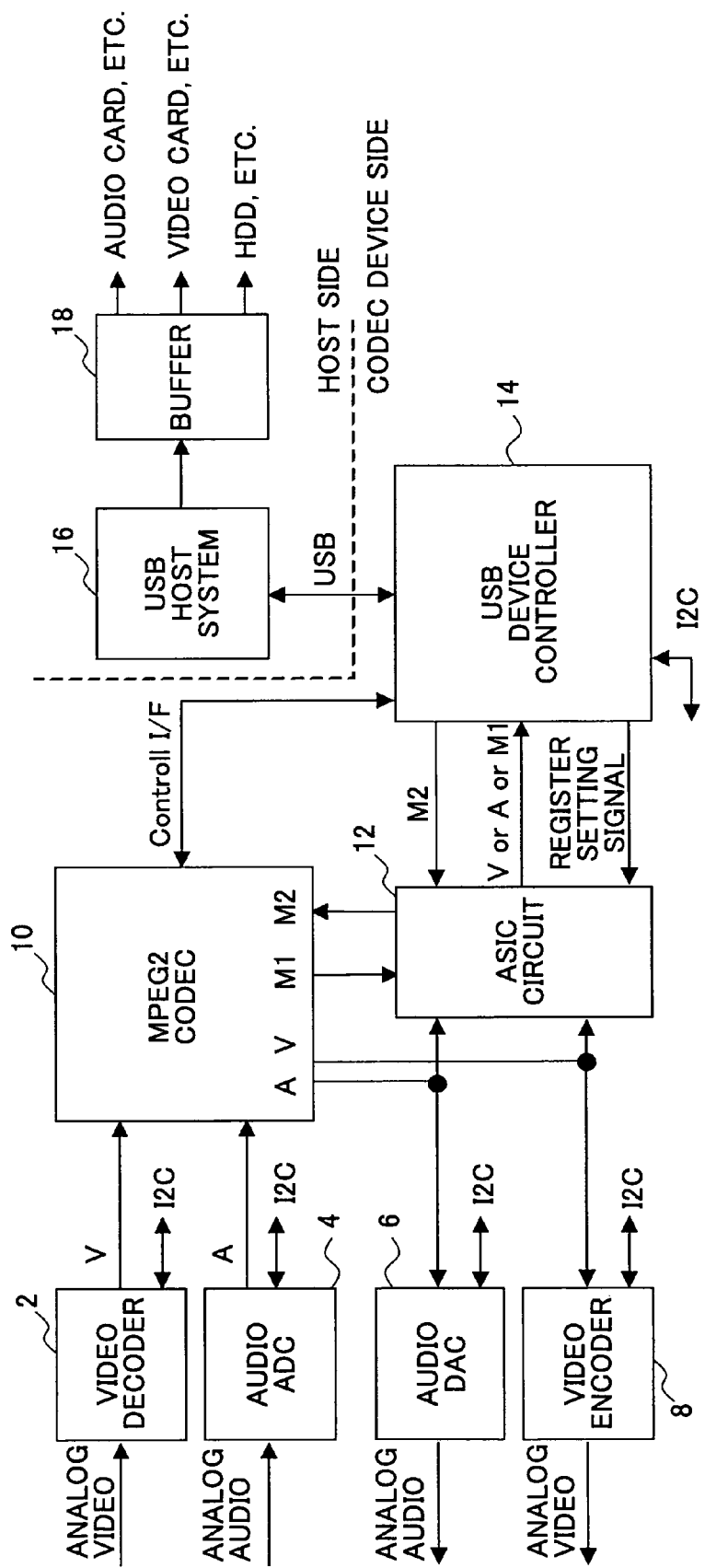
FIG. 1 is a block diagram showing an example of the system comprising the host system and the data encoding/decoding apparatus in which the task scheduling method of the invention is embodied.

FIG. 1 shows an example of the system comprising the host system and the data encoding/decoding apparatus in which the task scheduling method of the invention is embodied.

The system of FIG. 1 is composed of the composition on the side of the host system and the composition on the side of the data encoding/decoding apparatus (CODEC device). In the host system, the USB host system 16 comprising the CPU (not shown) of the host system, and the buffer 18 in the main memory of the host system are provided.

In the data encoding/decoding apparatus of FIG. 1, the video decoder (NTSC DECODER etc.) 2, the audio ADC (analog-to-digital converter) 4, the audio DAC (digital-to-analog converter) 6, the video encoder 8 (NTSC ENCODER etc.), the MPEG2 CODEC (MPEG2 PS/TS CODEC etc.) 10, the ASIC circuit 12, and the USB device controller 14 are provided.

The video decoder 2 receives the analog video signal from the input device (not shown), such as the camera, and outputs the non-compressed video data V. The audio ADC 4 receives the analog audio signal from the input device (not shown), such as the microphone, and outputs the non-compressed audio data A.

The audio DAC 6 receives the non-compressed audio data A, and outputs the analog audio signal to the external device (not shown). The video encoder 8 receives the non-compressed video data V, and outputs the analog video signal to the external device.

In the system of FIG. 1, the USB host system 16 and the USB device controller 14 are interconnected by the USB bus. The CPU of the USB host system 16 outputs the control command of the user definition to the USB device controller 14 using the bulk transfer or the control transfer.

Or it is also possible to apply the task scheduling method of the present invention to the system which uses the IEEE1394 serial bus for interconnecting the device controller 14 and the host system 16, instead of the USB bus.

The USB device controller 14 performs control of the ASIC circuit 12, the MPEG2 CODEC 10, the video decoder 2, the video encoder 8, the audio ADC 4, and the audio DAC 6 according to the control command received from the USB host system 16, respectively. A description of the MPEG2 CODEC 10 will be given later using FIG. 2. Moreover, a description of the ASIC circuit 12 will be given later using FIG. 3.

In FIG. 1, "V" denotes the non-compressed video data (YUV video signal etc.), "A" denotes the non-compressed audio data (LPCM audio signal etc.), "M1" denotes the compressed audio/video data (MPEG2 PS or TS) which is created by the compression coding of the MPEG2 CODEC 10, and "M2" denotes the compressed audio/video data (MPEG2 PS or TS) which is transferred to the MPEG2 CODEC 10 through the buffer 18 from the external device.

Figure 2:
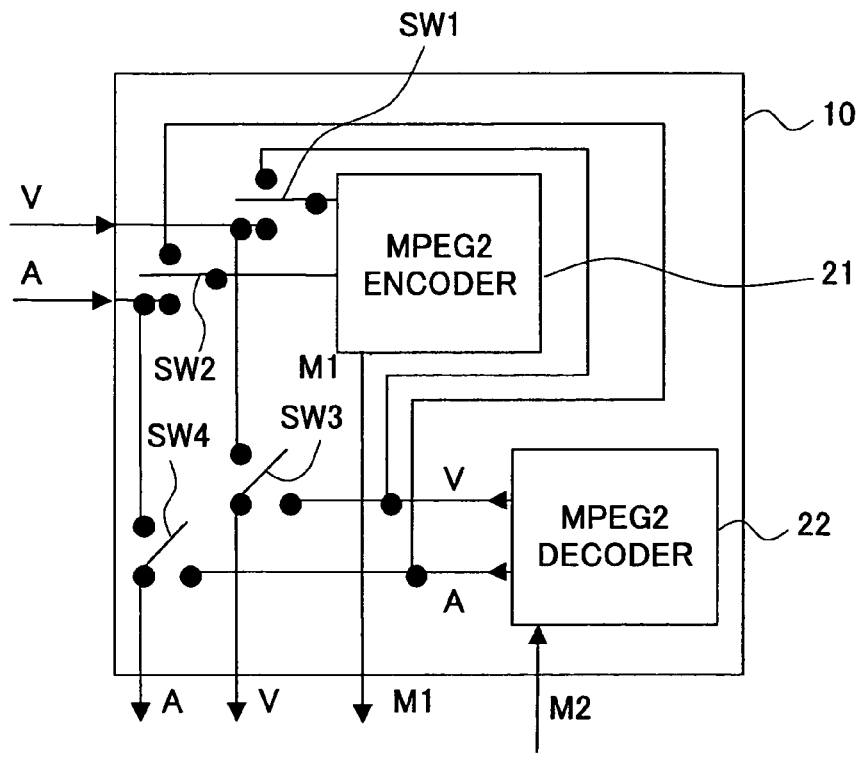
FIG. 2 is a block diagram showing the composition of the MPEG2 CODEC in the system of FIG. 1.

FIG. 2 shows the composition of the MPEG2 CODEC 10 in the system of FIG. 1.

The MPEG2 CODEC 10 of FIG. 2 comprises the MPEG2 encoder 21, the MPEG2 decoder 22, the switch SW1, the switch SW2, the switch SW3, and the switch SW4.

The MPEG2 encoder 21 receives the non-compressed video data V from the video decoder 2 and the non-compressed audio data A from the audio ADC 4, carries out compression coding, and outputs the compressed audio/video data M1.

The non-compressed video data V and the non-compressed audio data A are suitably selected by means of the switch SW1 and the switch SW2, and the selected data is inputted to the MPEG2 encoder 21.

The MPEG2 decoder 22 receives and decodes the compressed audio/video data M2 which is transferred to the MPEG2 CODEC 10 through the buffer 18 from the external device, and outputs the non-compressed video data V and the non-compressed audio data A.

Moreover, the non-compressed video data V and the non-compressed audio data A, which are outputted from the MPEG2 decoder 22, are suitably selected by means of the switch SW3 and the switch SW4, and the selected data is outputted from the MPEG2 CODEC 10 to one of the video encoder 8 and the audio DAC 6 and outputted also to the ASIC circuit 12.

Figure 3:
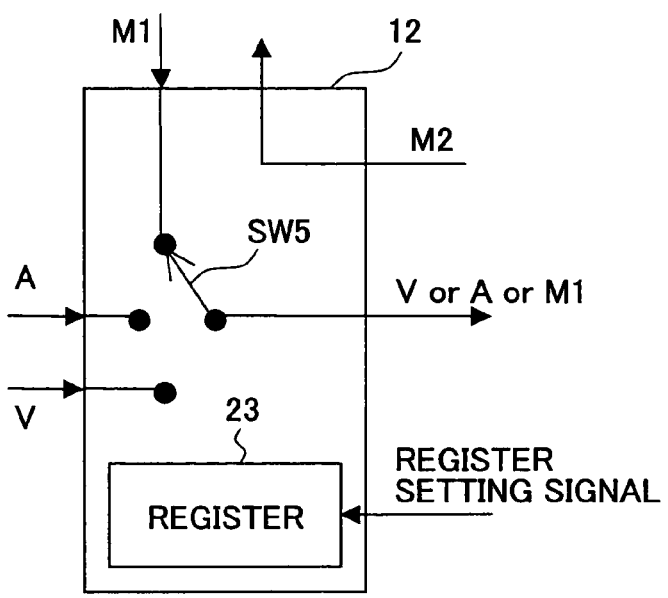
FIG. 3 is a block diagram showing the composition of the ASIC circuit in the system of FIG. 1.

FIG. 3 shows the composition of the ASIC circuit 12 in the system of FIG. 1.

The ASIC circuit 12 of FIG. 3 comprises the switch SW5 and the register 23 for controlling switching operation of the switch SW5, which are provided in the multiplexer. A description of the operation of the ASIC circuit 12 will be given later.

In the system of FIG. 1, selection of the data transferred to the USB device controller 14 is performed by the multiplexer in the ASIC circuit 12. This multiplexer comprises the switch SW5 and the register 23, and includes a set of terminals (not shown). By activating one of the terminals, the multiplexer notifies to the USB device controller 14 which data transferred to the USB device controller 14 is selected.

Figure 4:
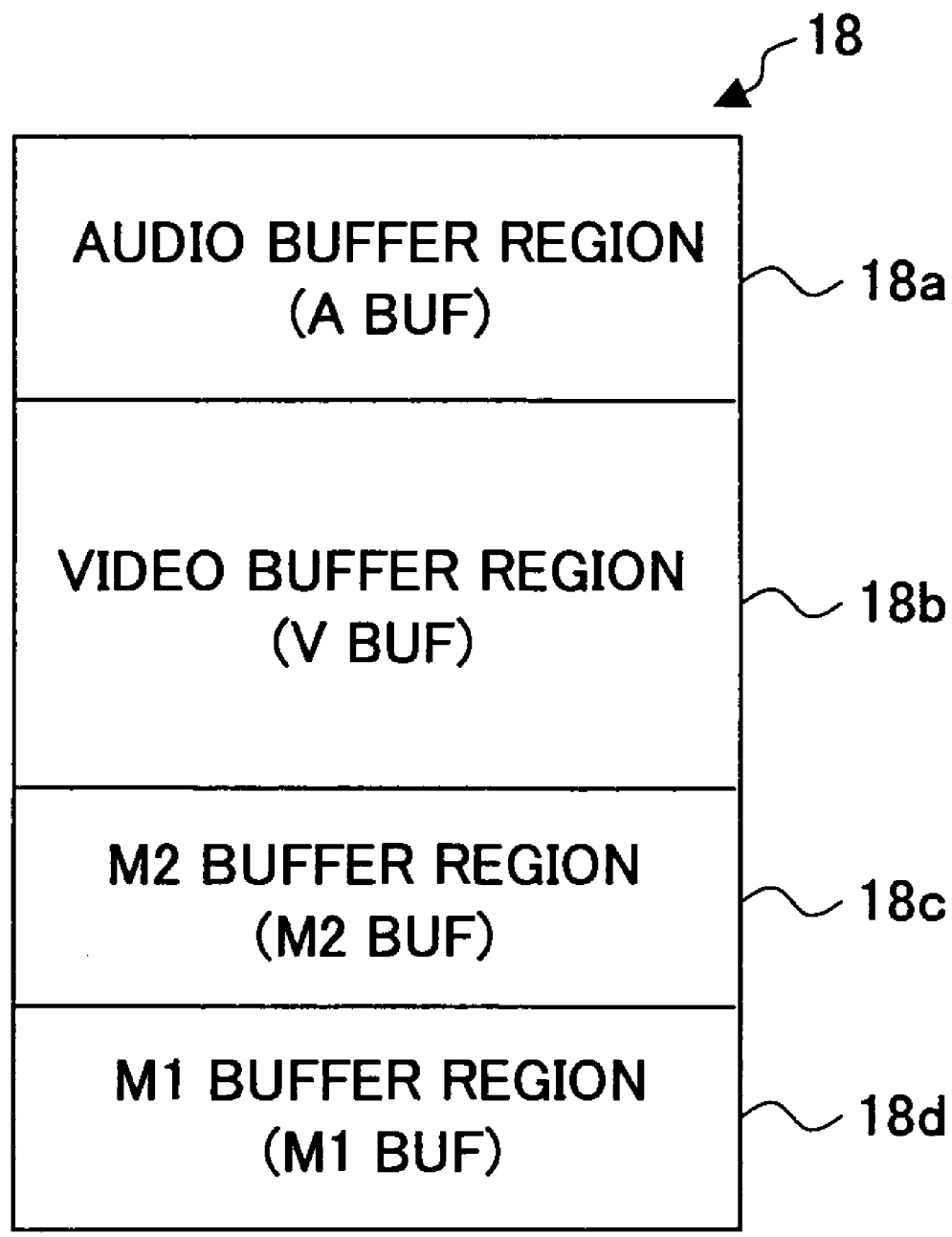
FIG. 4 is a diagram showing the composition of the buffer of the host system in the system of FIG. 1.

FIG. 4 shows the composition of the buffer 18 in the main memory of the USB host system 16 in the system of FIG. 1.

As shown in FIG. 4, in the buffer 18 in the main memory of the USB host system 16, the four buffer regions are provided, and a predetermined size (storage capacity) is assigned for each region according to the kind of the data being held, respectively.

The buffer 18 comprises the audio buffer region 18a which is the buffer region (A BUF) for holding the non-compressed audio data A, the video buffer region 18b which is the buffer region (V BUF) for holding the non-compressed video data V, the M1 buffer region 18c which is the buffer region (M1 BUF) for holding the compressed audio/video data M1 from the data encoding/decoding apparatus, and the M2 buffer region 18d which is the buffer region (M2 BUF) for holding the compressed audio/video data M2 from the external device.

In the system of FIG. 1, the USB controller uses the end point assigned to each data, and carries out data transfer between the USB host system 16 and the USB device controller 14.

Figure 5:
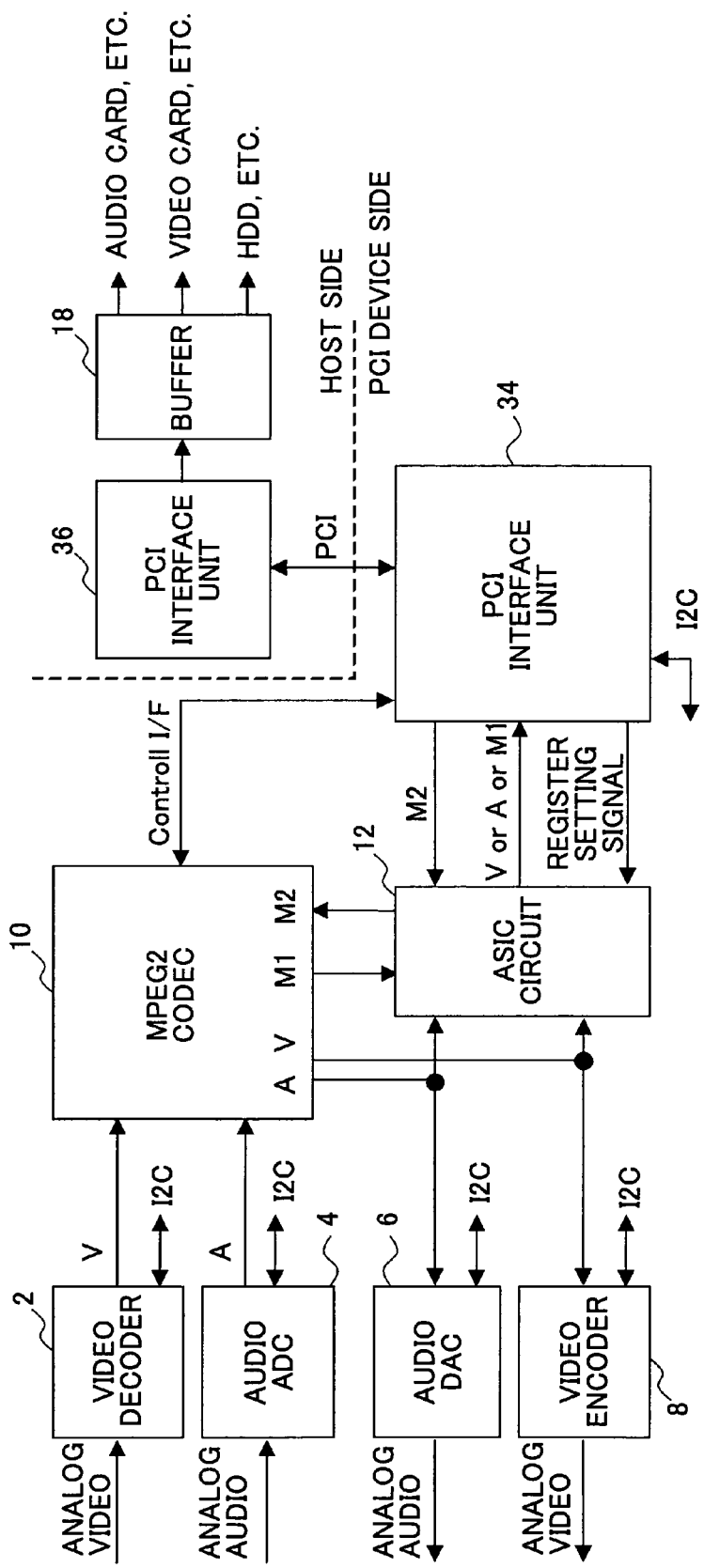
FIG. 5 is a block diagram showing another example of the system comprising the host system and the data encoding/decoding apparatus in which the task scheduling method of the invention is embodied.

FIG. 5 shows the composition of another example of the system comprising the host system and the data encoding/decoding apparatus in which the task scheduling method of the invention is embodied.

In the above-described system of FIG. 1, the USB device controller 14 and the USB host system 16 are interconnected by the USB bus, and the USB interface is used so that the data transfer between the host system and the data encoding/decoding apparatus is performed.

The task scheduling method of the present invention is not limited only to this embodiment. For example, it may be applicable also to the system using the PCI (peripheral component interconnect) interface etc.

In the system of FIG. 5, the PCI interface (PCI I/F) 36 on the side of the host system and the PCI-interface (PCI I/F) 34 on the side of the data encoding/decoding apparatus are interconnected by the PCI bus. The system of FIG. 5 uses this PCI bus so that the data transfer between the host system and the data encoding/decoding apparatus is performed.

The other composition of the system of FIG. 5 is essentially the same as that of the system of FIG. 1. In FIG. 5, the elements which are the same as corresponding elements in FIG. 1 are designated by the same reference numerals, and a description thereof will be omitted.

Figure 6B:
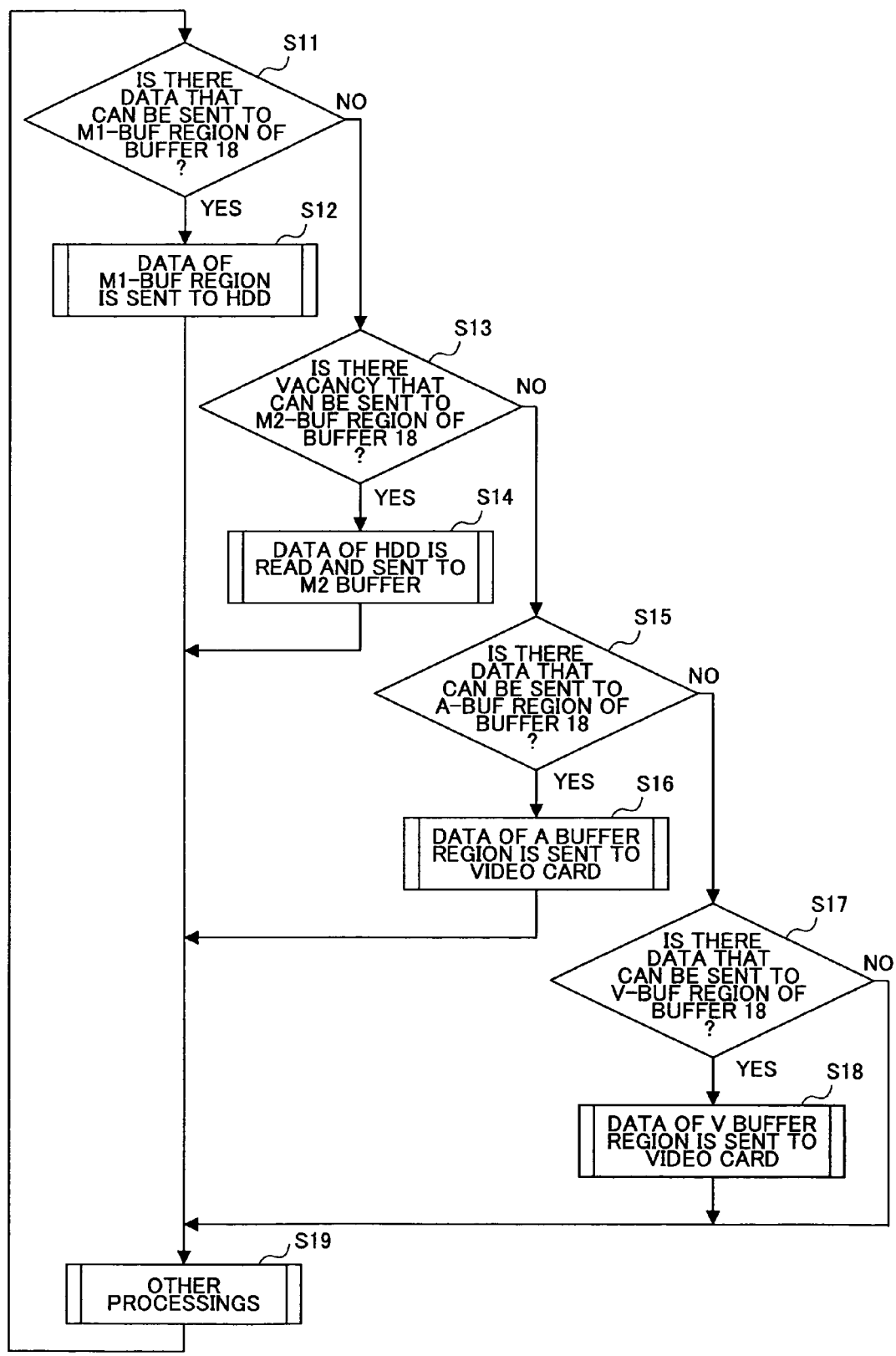
FIG. 6B is a flowchart for explaining one embodiment of the task scheduling method of the present invention.

FIG. 6A is the flowchart for explaining the example in the procedure of transferring the compressed data and the non-compressed data with the same transfer priority. FIG. 6B is the flowchart for explaining one embodiment of the task scheduling method of the present invention.

Generally, as for the multitasking operating systems (OS), the method of assigning the transfer priority for each data varies with the individual OS. In the procedures of FIG. 6A and FIG. 6B, it is supposed that the case where the CPU of the USB host system 16 of FIG. 1 performs processing under the single-tasking OS will be described as a typical example.

However, the present invention is not limited to this example, and even when it is performed under the multitasking OS, the task scheduling method of the present invention can be realized by using the same principle as in the procedure of FIG. 6B.

In each of the following steps, the unit of the amount of data transferred at a time is set to for example 32 K bytes, and if the CPU of the USB host system 16 (which will be referred to as the CPU) determines whether the data in the buffer 18 that can be transferred exists or not and the amount of data currently held in the buffer 18 is less than 32 K bytes, then it is determined that there is no data that can be transferred (NO). On the other hand, if the amount of data currently held in the buffer 18 exceeds 32 K bytes, then it is determined that there is the data which can be transferred (YES).

The procedure of FIG. 6A in case of transferring the compressed data and the non-compressed data with the same transfer priority will be explained.

The procedure of FIG. 6A is started if the CPU of the USB host system 16 of FIG. 1 receives a request for simultaneously transferring the compressed data and the non-compressed data between the USB host system and the data encoding/decoding apparatus.

First, in step S11, it is determined whether the CPU has the data which can be transferred in the M1 buffer region 18c of the buffer 18.

When the determination result of step S11 is YES, in step S12, the CPU transfers the data of the M1 buffer region 18c to the external hard disk drive (HDD) etc. After the end of step S12 the control is transferred to step S13.

When the determination result of step S11 is NO, the following step S13 is performed without performing the step S12. In step S13, it is determined whether the CPU has the vacancy which can be transferred in the M2 buffer region 18d of the buffer 18.

When the determination result of step S13 is YES, in step S14, the CPU reads the data from the external HDD and transfers it to the M2 buffer region 18d. After the end of step S14 the control is transferred to step S15.

When the determination result of step S13 is NO, the following step S15 is performed without performing the step S14. In step S15, it is determined whether the CPU has the data which can be transferred in the audio buffer region 18a of the buffer 18.

When the determination result of step S15 is YES, in step S16, the CPU transfers the data of the audio buffer region 18a to the external audio card etc. After the end of step S16 the control is transferred to step S17.

When the determination result of step S15 is NO, the following step S17 is performed without performing the step S16. In step S17, it is determined whether the CPU has the data which can be transferred in the video-buffer region 18b of the buffer 18.

When the determination result of step S17 is YES, in step S18, the CPU transfers the data of the video-buffer region 18b to the external video card etc. After the end of step S18 the control is transferred to step S19.

When the determination result of step S17 is NO, the following step S19 is performed without performing the step S18. In step S19, the CPU performs other processings than those described above.

After step S19 is completed, the control is returned back to the step S11, and the same procedure is repeated and performed.

In the procedure of FIG. 6A, the data of M1 buffer region 18c is not subjected to transfer processing after the end of the data-transfer processing of M1 buffer region 18c until all the data-transfer processings of the M2 buffer region 18d, the audio buffer region 18a, and the video-buffer region 18b are completed. In the meantime, if the compressed data from the USB bus is transferred to the buffer 18, the buffer 18 may overflow. If the overflowing of the buffer 18 occurs, there is the problem that all the information that should be transferred cannot be transferred.

Next, the procedure of FIG. 6B will be explained. The procedure of FIG. 6B shows one embodiment of the task scheduling method of the present invention.

The procedure of FIG. 6B is started if the CPU of the USB host system 16 of FIG. 1 receives a request for simultaneously transferring the compressed data and the non-compressed data between the USB host system and the data encoding/decoding apparatus.

First, in step S11, it is determined whether the CPU has the data which can be transferred in the M1 buffer region 18c of the buffer 18.

When the determination result of step S11 is YES, in step S12, the CPU transfers the data of M1 buffer region 18c to the external hard disk drive (HDD) etc. After step S12 is completed, the CPU performs other processings in step S19. After step S19 is completed, the control is returned to the step S11, and the same procedure is repeated and performed.

When the determination result of step S11 is NO, the following step S13 is performed without performing the step S12. In step S13, it is determined whether the CPU has the vacancy which can be transferred in the M2 buffer region 18d of the buffer 18.

When the determination result of step S13 is YES, in step S14, the CPU reads the data from the external HDD and transfers it to the M2 buffer region 18d. After the end of step S14 the control is transferred to step S19.

When the determination result of step S13 is NO, the following step S15 is performed without performing the step S14. In step S15, it is determined whether the CPU has the data which can be transferred in the audio buffer region 18a of the buffer 18.

When the determination result of step S15 is YES, in step S16, the CPU transfers the data of the audio buffer region 18a to the external audio card etc. After the end of step S16 the control is transferred to step S19.

When the determination result of step S15 is NO, the following step S17 is performed without performing the step S16. In step S17, it is determined whether the CPU has the data which can be transferred in the video buffer region 18b of the buffer 18.

When the determination result of step S17 is YES, in step S18, the CPU transfers the data of the video-buffer region 18b to the external video card etc. After the end of step S18 the control is transferred to step S19.

When the determination result of step S17 is NO, the step S19 is performed without performing the step S18.

In the procedure of FIG. 6B, as long as there is the compressed data M1 which can be transferred in the M1 buffer region 18c, the transfer of the compressed data M1 to the external device has priority, and it is processed first.

Here, suppose that, when there is no compressed data M1 which can be transferred in the M1 buffer region 18c, the transfer processing of other data M2, A, and V is performed. Also in such a case, after the other data is transferred, the existence of the compressed data M1 which can be transferred in the M1 buffer region 18c is always checked because the control is transferred to the step S11 after the end of the step S19.

When it is again determined that there is the compressed data M1, the compressed data M1 is immediately transferred to the external device after the transfer processing of other data M2, A, and V. Therefore, performing the procedure of FIG. 6B realizes the task scheduling method in which the transfer priority (AVCOMP1) of the compressed audio/video data M1 is set up to be higher than the transfer priority (VRAW) of the non-compressed video data V or the transfer priority (ARAW) of the non-compressed audio data A.

According to the task scheduling method of this embodiment, in case the simultaneous transfer of the compressed data and the non-compressed data is carried out between the host system and the data encoding/decoding apparatus, the transfer priority in the case of transferring the compressed data to the external hard disk drive etc. from the buffer 18 can be made high, and it is possible to certainly record all the compressed data from the buffer 18 which should be recorded in the hard disk drive etc. Moreover, it is possible to prevent the overflowing of the buffer 18 certainly.

Generally, the amount of data of the non-compressed video data V which should be transferred is much larger than the amount of data of the non-compressed audio data A which should be transferred, and it is desirable to set up the transfer priority ARAW of the non-compressed audio data A to be higher than the transfer priority VRAW of the non-compressed video data V, in order to attain the purpose of preventing the overflowing of the buffer 18.

In the procedure of FIG. 6B, by performing the steps S11-S12, the steps S15-S16, and the steps S17-S18 in this sequence, the simultaneous transfer of compressed data and non-compressed data between the host system and the data encoding/decoding apparatus can be carried out such that the transfer priority conditions: AVCOMP1>ARAW≧VRAW are satisfied.

Furthermore, by performing the steps S11-S12 and the steps S13-S14 in this sequence in the procedure of FIG. 6B, the transfer priority AVCOMP1 of the compressed audio/video data M1 can be set up to be higher than the transfer priority AVCOMP2 of the transferring task which transfers the compressed audio/video data M2 from the outside to the data encoding/decoding apparatus through the buffer 18.

Namely, by performing the procedure of FIG. 6B, the simultaneous transfer of the compressed data and the non-compressed data between the host system and the data encoding/decoding apparatus can be carried out such that the transfer priority condition: AVCOMP1>AVCOMP2 is satisfied.

Figure 7A:
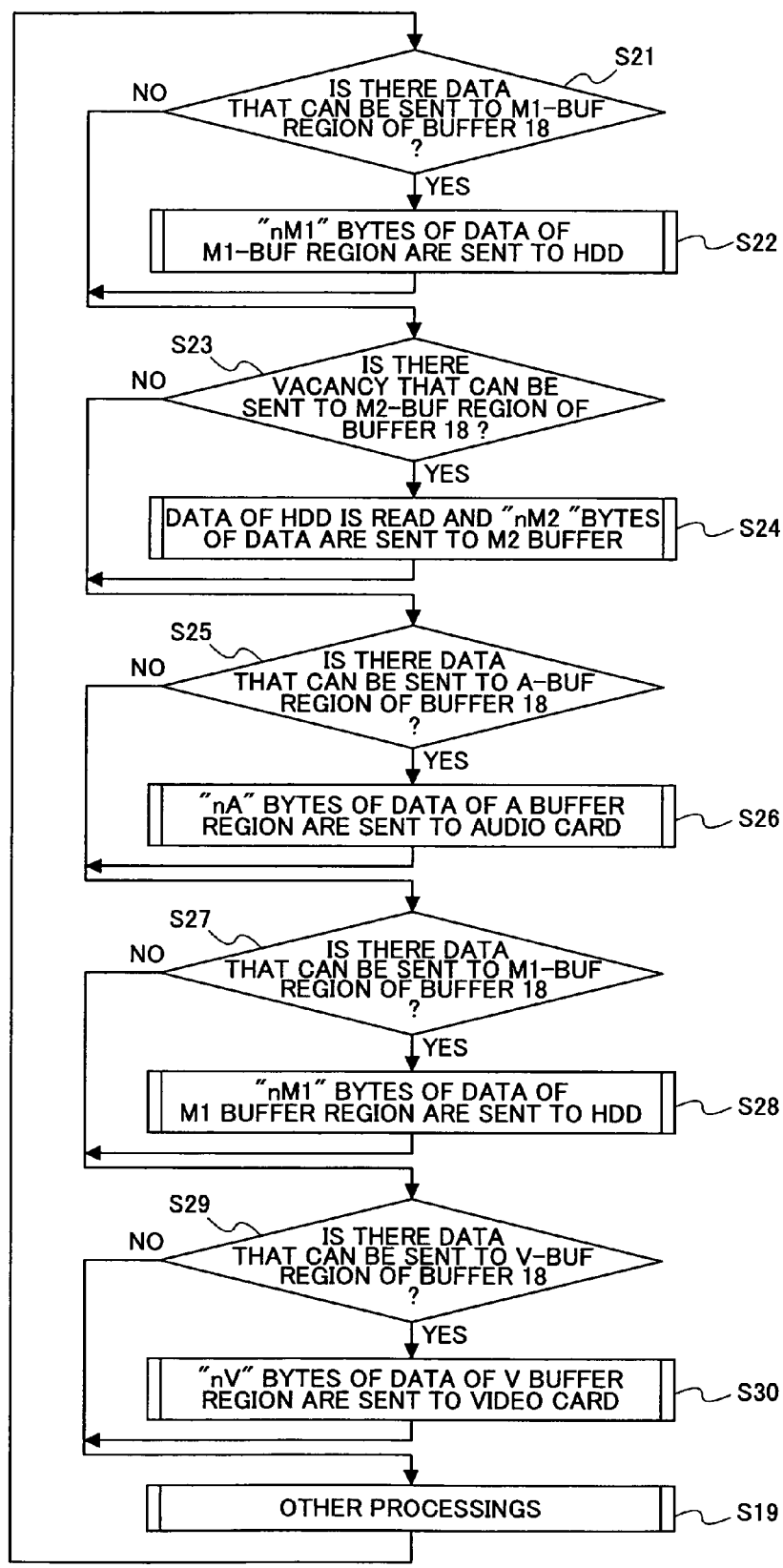
FIG. 7A is a flowchart for explaining other embodiments of the task scheduling method of the present invention.

FIG. 7A is the flowchart for explaining another embodiment of the task scheduling method of the present invention.

If there is the data which can be transferred in the buffer 18 in the case of the procedure of FIG. 6B, the data will be transferred one after another. Thus, it may be likely that the transfer opportunity of the non-compressed video data V with the low transfer priority is decreased too much.

To avoid the problem, the unit of the data transfer at a time can be restricted to a predetermined data size (the byte count), for example 32 Kbytes, and the remaining data is transferred in the following transfer opportunity so that it is possible to raise the data-transfer efficiency.

There is the method in which the opportunity to judge the existence of the data in the buffer 18 about the transfer to which the high priority is given is increased and the different transfer priority levels are given for the respective transfers of the compressed data and the non-compressed data. The procedure of FIG. 7A is the example in which the above method is used.

In the procedure of FIG. 7A, the CPU determines in step S21 whether it has the data which can be transferred in the M1 buffer region 18c of the buffer 18.

When the determination result of step S21 is YES, in step S22, the CPU transfers the data of M1 buffer region 18c to the external hard disk drive (HDD) etc. by the nM1 bytes. After the end of step S22, the control is transferred to step S23.

When the determination result of step S21 is NO, the following step S23 is performed without performing the step S22. In step S23, the CPU determines whether it has the vacancy which can be transferred in the M2 buffer region 18d of the buffer 18.

When the determination result of step S23 is YES, in step S24, the CPU reads the data from HDD and transfers to the M2 buffer region 18d by the nM2 bytes. After the end of step S24 the control is transferred to step S25.

When the determination result of step S23 is NO, the following step S25 is performed without performing the step S24. In step S25, the CPU determines whether it has the data which can be transferred in the audio buffer region 18a of the buffer 18.

When the determination result of step S25 is YES, in step S26, the CPU transfers the data of the audio buffer region 18a to the external audio card etc. by the nA bytes. After the end of step S26 the control is transferred to step S27.

When the determination result of step S25 is NO, the following step S27 is performed without performing the step S26. In step S27, the CPU determines whether it has the data which can be transferred in the M1 buffer region 18c of the buffer 18.

When the determination result of step S27 is YES, in step S28, the CPU transfers the data of M1 buffer region 18c to the external hard disk drive (HDD) etc. by the nM1 bytes. After the end of step S28 the control is transferred to step S29.

When the determination result of step S27 is NO, the following step S29 is performed without performing the step S28. In step S29, the CPU determines whether it has the data which can be transferred in the video-buffer region 18b of the buffer 18.

When the determination result of step S29 is YES, in step S30, the CPU transfers the data of video-buffer region 18b to the external video card etc. by the nV bytes. After the end of step S30 the control is transferred to step S19.

When the determination result of step S29 is NO, the following step S19 is performed without performing the step S30. In step S19, the CPU performs other processings except having described above.

After step S19 is completed, the control is returned to the step S21, and the same procedure is repeated and performed.

In the procedure of FIG. 7A, the transfer priority of the compressed data M1 is most highly set up by setting up more transfer opportunities of the compressed data M1 than other data-transfer opportunities.

In this embodiments, the numeric values of the unit data transfer byte counts nM1, nM2, nA, and nV for the respective data are determined depending on the usage of processing or the processing balance, etc.

Figure 7B:
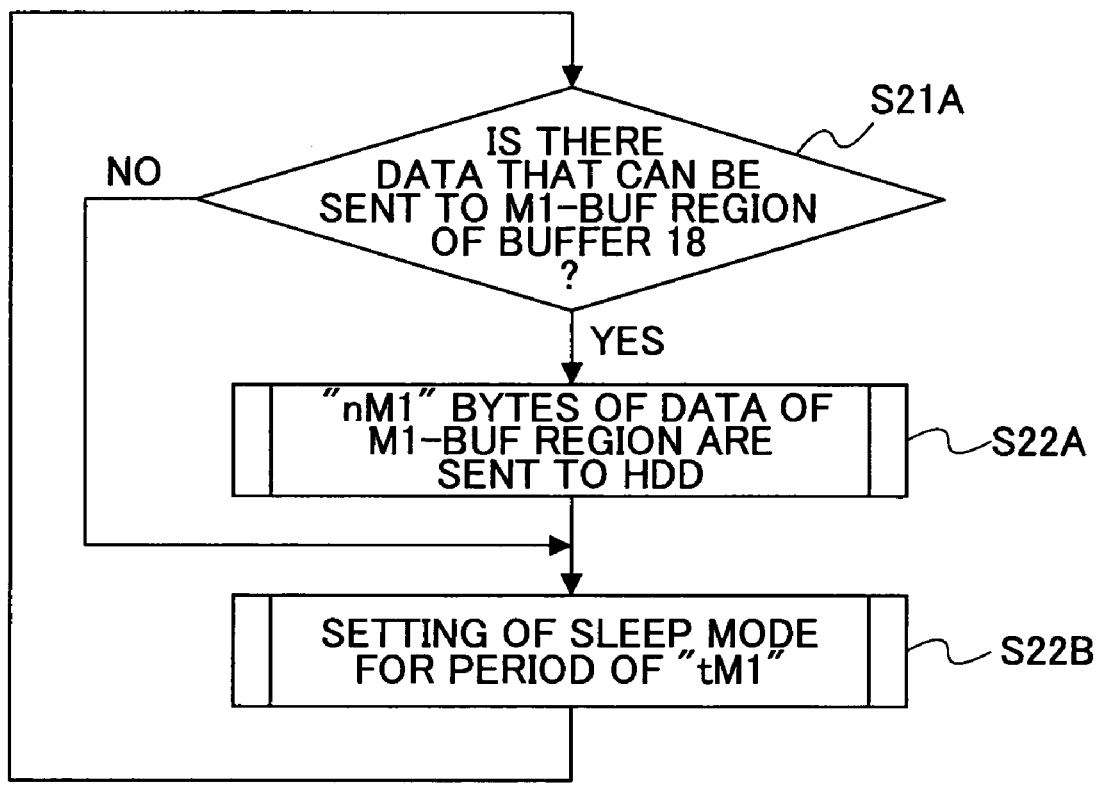
FIG. 7B is a flowchart for explaining the example which adjusts the transfer priority by changing sleep time in the case of the multitasking OS.

FIG. 7B is the flowchart for explaining the example in which the sleep time is changed in the case of the multitasking OS so that the transfer priority is adjusted.

Generally, in the case of the multitasking OS, if the task is assigned for every transfer processing and one transfer processing is completed by each task, the method in which the predetermined sleep time is set as the task and the CPU time is assigned to the task of other transfer processings is taken.

There is the method in which the different transfer priority levels are given for the respective transfers of the compressed data and the non-compressed data by setting the sleep time to a short time for the high transfer priority and setting the sleep time to a long time for the low transfer priority among the respective transfer processings.

The procedure of FIG. 7B is the example in which this method is used, and it is illustrated only for the procedure of the transfer processing of the compressed data M1.

In the procedure of FIG. 7B, the CPU determines in step S21A whether it has the data which can be transferred in the M1 buffer region 18c of the buffer 18.

When the determination result of step S21A is YES, in step S22A, the CPU transfers the data of M1 buffer region 18c to the external hard disk drive (HDD) etc. by the nM1 bytes.

After step S22A is completed, in step S22B, the CPU sets the sleep time for the task of the compressed data transfer processing to the tM1 time.

When the determination result of step S21A is NO, the step S22B is performed without performing the step S22A. When the sleep time tM1 set by the step S22B has elapsed, the control is returned to the step S21A, and the same procedure is repeated and performed.

Similar to the procedure of FIG. 7B, under the control of the multitasking OS, the CPU performs the procedure of each transfer processing of the compressed data M2, the non-compressed audio data A, and the non-compressed video data V, and sets up the sleep times of tM2, tA, and tV, respectively.

The frequency at which each transfer processing is performed for unit time is changed by setting up such sleep time so that the conditions: $tM1 < tM2 < tA \leq tV$ are satisfied. Thus, the different transfer priority levels can be set up for the respective transfers of the compressed data and the non-compressed data similar to the embodiment of FIG. 6B.

FIG. 8A is the flowchart for explaining another embodiment of the task scheduling method of the present invention.

In the case of the procedure of FIG. 7A, the transfer processings other than the transfer processing of the highest priority are performed little by little, no problem will arise if the total amount of the data in the transfer processings does not exceed the capacity of the CPU.

However, if the load of the other processings is increased, it is difficult to perform all the data transfer processings in parallel.

In such a case, it is desirable to use the method in the control is performed to suspend the transfer processings other than the transfer processing of the highest priority as the emergency countermeasure.

In order to realize this, the predetermined threshold is set up for the amount of data of the M1 buffer region 18c which is related to the transfer processing of the highest priority, and the step of determining whether the amount of data of the M1 buffer region 18c is larger than the predetermined threshold is added.

According to the above method, if the determination result shows that the amount of data of the M1 buffer region 18c exceeds the threshold (the state of emergency), the transfer processings other than the transfer processing of the highest priority are suspended.

The procedure of FIG. 8A is the example in which this method is used. In the procedure of FIG. 8A, the steps S31-S34 and the steps S36-S41 are essentially the same as the steps S21-S24 and the steps S25-S30 in FIG. 7A, respectively, and a description thereof will be omitted.

In the procedure of FIG. 8A, after the transfer processing of steps S33-S34 is completed, the CPU at step S35 determines whether the amount of data of M1 buffer region 18c is larger than the predetermined threshold.

When the determination result of step S35 is NO, each transfer processing of steps S36-S41 is performed.

On the contrary, when the determination result of step S35 is YES, the following step S19 (which is the same as step S19 in FIG. 7A) is performed without performing each transfer processing of steps S36-S41. That is, the transfer processings (steps S36-S41) other than the transfer processing of the highest priority (step S31-S34) are suspended.

In the procedure of FIG. 8A, the step S35 is added after the transfer processing of steps S33-S34. However, the task scheduling method of the invention is not limited to this embodiment. For example, if the step S35 is added after the transfer processing of steps S36-S37, the non-compressed audio data-transfer processing to the external device from the audio buffer region 18a will be continued also in the state of emergency without stopping.

Since the non-compressed audio data is smaller in the amount of data than the non-compressed video data, the load of the non-compressed audio data transfer does not become larges than the load of the non-compressed video data also in the state of emergency. For this reason, it is possible to use the above method.

Moreover, it is possible to add the threshold comparison processing to both the ends of the steps S33-S34 and the steps S36-S37, and the threshold level at the end of the steps S36-S37 is lower than the threshold level at the end of the steps S33-S34. According to this method, it is determined that the transfer of the non-compressed video data will be stopped if the threshold is first exceeded by the threshold comparison at the end of the steps S36-S37. If the amount of data of the M1-BUF still continues to increase and it exceeds the threshold by the following threshold comparison at the end of the steps S33-S34 the transfer of the non-compressed audio data will also be stopped.

Figure 8B:
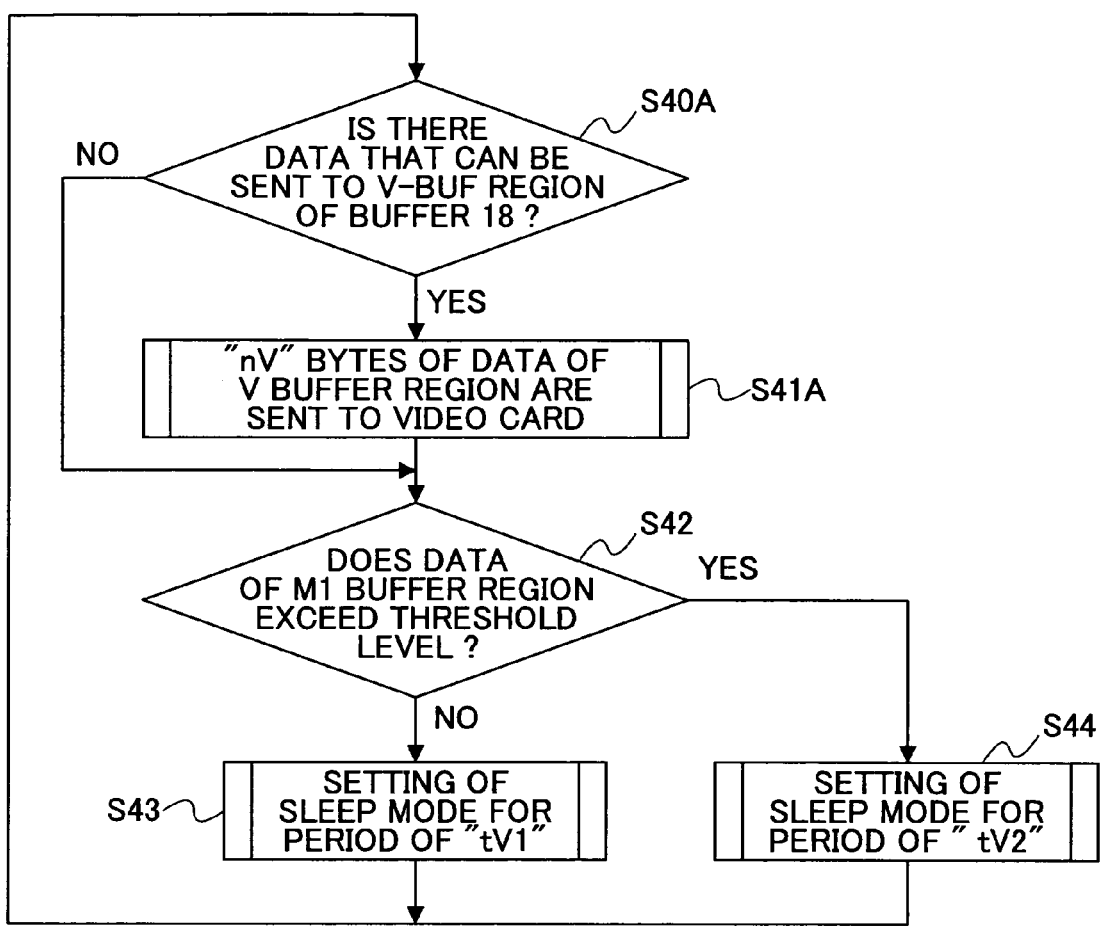
FIG. 8B is a flowchart for explaining the example which adjusts the transfer priority by changing sleep time in the case of the multitasking OS.

FIG. 8B is the flowchart for explaining the example in which the transfer priority is adjusted by changing the sleep time in the case of the multitasking OS. The procedure of FIG. 8B shows only the procedure of the transfer processing of the non-compressed video data V.

In the procedure of FIG. 8B, the CPU at step S40A determines whether it has the data which can be transferred in the video-buffer region 18b of the buffer 18.

When the determination result of step S40A is YES, in step S41A, the CPU transfers the data of video-buffer region 18b to the external video card etc. by the nV bytes. After the end of step S41A, the CPU performs the following step S42.

When the determination result of step S40A is NO, the following step S42 is performed without performing the step S41A. In step S42, the CPU determines whether the amount of data of video-buffer region 18b is larger than the predetermined threshold.

When the determination result of step S42 is NO, in step S43, the CPU sets the sleep time for the task of transfer processing of the non-compressed video data V to the tV1 sleep time. When the sleep time tV1 set by the step S43 has elapsed, the control is returned to the step S40A, and the same procedure is repeated and performed.

When the determination result of step S42 is YES (the state of emergency), in step S44, the CPU sets the sleep time for the task of transfer processing of the non-compressed video data V to the tV2 sleep time. When the sleep time tV2 set by the step S44 has elapsed, the control is returned to the step S40A, and the same procedure is repeated and performed.

Similar to the procedure of FIG. 8B, under the control of the multitasking OS, the CPU performs the respective procedures of the transfer processing of the compressed data M1, the compressed data M2, and the non-compressed audio data A, and sets up the sleep times of tM1, tM2, and tA time, respectively.

The frequency at which each transfer processing is performed for the unit time is changed by setting up the sleep times so that the conditions: $tM1 < tM2 < tA \leq tV1$ are satisfied.

In the procedure of FIG. 8B, the sleep time tV1 when it is not the state of emergency and the sleep time tV2 when it is the state of emergency are set up so that the condition $tV1 << tV2$ is satisfied.

The frequency of the transfer processing of the non-compressed video data V from the video-buffer region 18b to the external device is lowered in the state of emergency, and the priority of the other data-transfer processings is raised relatively by performing this setting.

Moreover, it is also possible by adding the determination steps that are the same as the steps S42-S44 in the procedure of FIG. 8B to the respective transfer processings of the compressed data M2 and the non-compressed audio data A in order to raise the transfer priority of the compressed data M1 further.

Figure 9A:
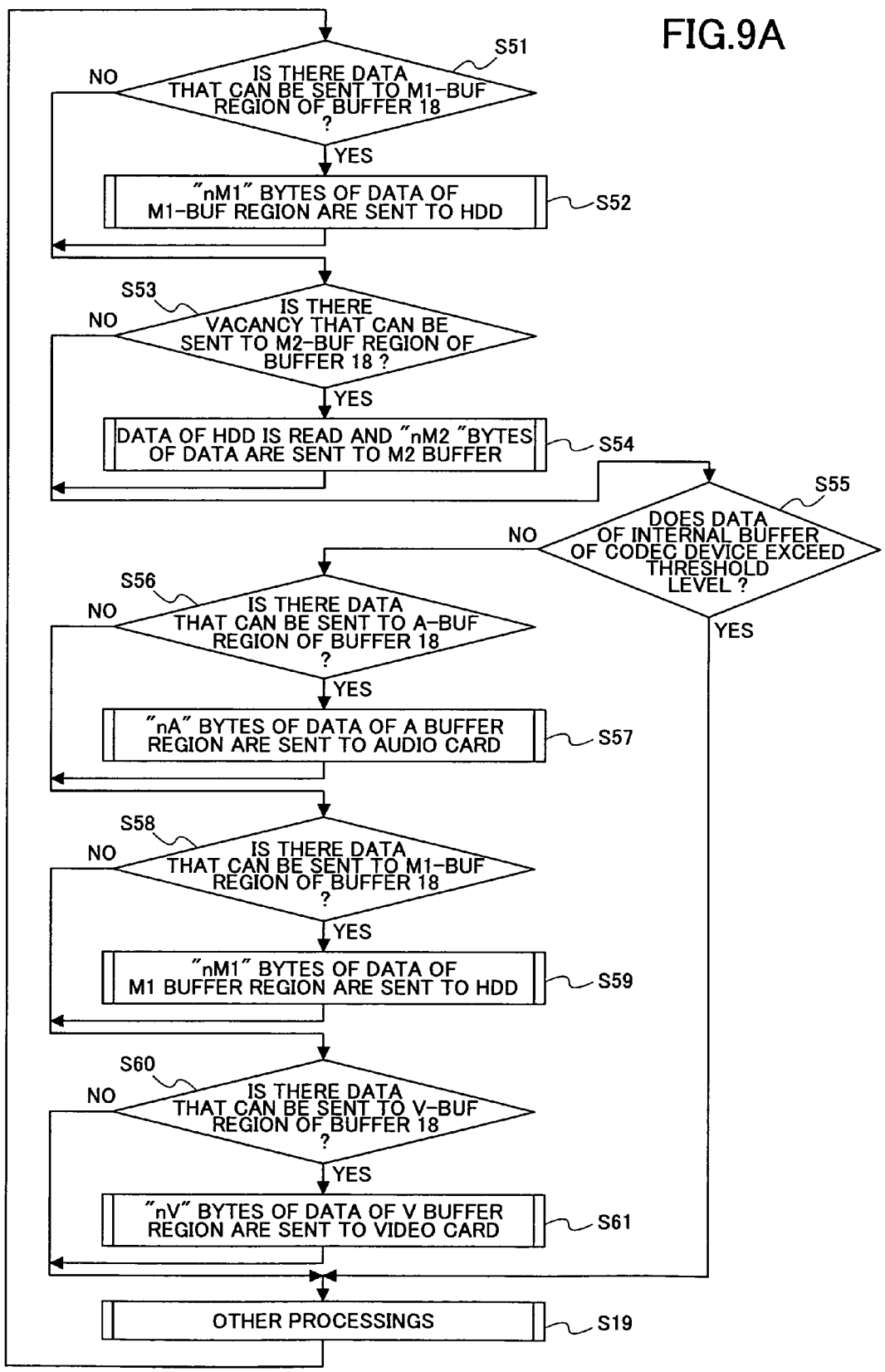
FIG. 9A is a flowchart for explaining other embodiments of the task scheduling method of the present invention.

FIG. 9A is the flowchart for explaining another embodiment of the task scheduling method of the present invention.

In the procedure of FIG. 8A, it is determined in step S35 whether the amount of data in the M1 buffer region 18c of the buffer 18 on the side of the host system exceeds the threshold.

On the other hand, the procedure of FIG. 9A is different from the above only in that it is determined in step S55 whether the amount of data of the compressed data M1 in the internal buffer on the side of the data encoding/decoding apparatus (MPEG2 CODEC 10, the ASIC circuit 12, and the USB device controller 14 are included) exceeds the predetermined threshold.

The amount of data of M1-BUF does not increase when the CPU load on the side of the host system increases and the transfer from the data encoding/decoding apparatus is not increased. This cannot be checked by the threshold comparison of M1-BUF as in FIG. 8A. But there is a possibility that the buffer on the side of the data encoding/decoding apparatus may overflow and the data may be lost too.

For this reason, in the procedure of FIG. 9A, the buffer on the side of the data encoding/decoding apparatus is monitored, it is determined whether the amount of the data exceeds the threshold, and the transfer may be restricted.

Similar to the bus master transfer in the case of the PCI bus, in the system configuration in which the transfer from the data encoding/decoding apparatus is not related to the CPU load, the procedure of FIG. 8 may also be practical.

The other steps S51-S54 and steps S56-S61 in the procedure of FIG. 9A are essentially the same as the steps S31-S34 and steps S36-S41 in the procedure of FIG. 8A, respectively, and a description thereof will be omitted.

Similar to FIG. 8A, in the procedure of FIG. 9A, if the step S55 is added after the transfer processing of steps S56-S57, the non-compressed audio data-transfer processing to the external device from the audio buffer region 18a will be continued also in the state of emergency, without stopping.

Figure 9B:
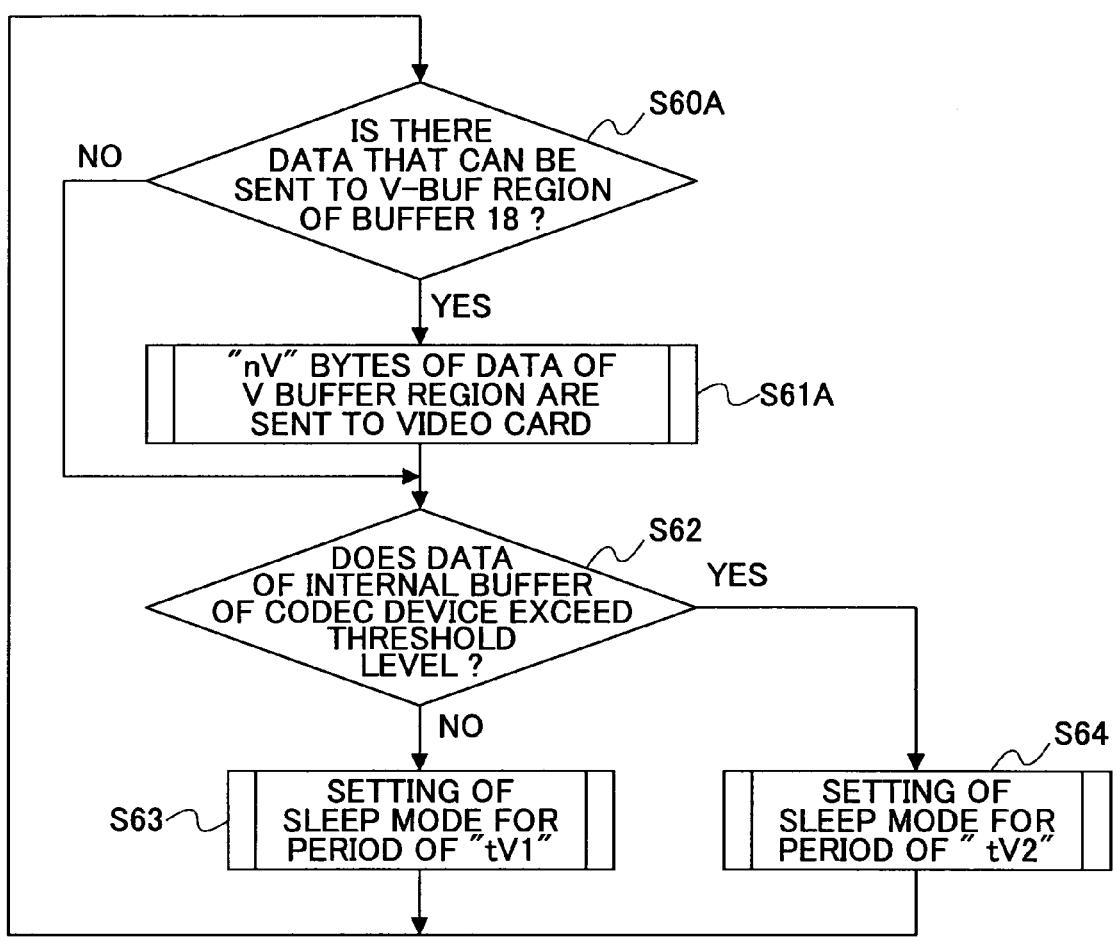
FIG. 9B is a flowchart for explaining the example which adjusts the transfer priority by changing sleep time in the case of the multitasking OS.

FIG. 9B is the flowchart for explaining the example in which the transfer priority is adjusted by changing the sleep time in the case of the multitasking OS. The procedure of FIG. 9B shows only the procedure of the transfer processing of the non-compressed video data V.

In the procedure of FIG. 9B, the CPU at step S60A determines whether it has the data which can be transferred in the video-buffer region 18b of the buffer 18.

When the determination result of step S60A is YES, in step S61A, the CPU transfers the data of video-buffer region 18b to the external video card etc. by the nV bytes. After the step S61A is completed, the following step S62 is performed by the CPU.

When the determination result of step S60A is NO, the following step S62 is performed without performing the step S61A. In step S62, the CPU determines whether the amount of data of the compressed data M1 in the internal buffer on the side of the data encoding/decoding apparatus (MPEG2 CODEC 10, the ASIC circuit 12, and the USB device controller 14 are included) exceeds the predetermined threshold.

When the determination result of step S62 is NO, in step S63, the CPU sets the sleep time for the task of the transfer processing of the non-compressed video data V to the sleep time tV1. When the sleep time tV1 set by the step S63 has elapsed, the control is returned to the step S60A and the same procedure is repeated and performed.

When the determination result of step S62 is YES (the state of emergency), in step S64, the CPU sets the sleep time for the task of transfer processing of the non-compressed video data V to the sleep time tV2. When the sleep time tV2 set by the step S64 has elapsed, the control is returned to the step S60A and same procedure is repeated and performed.

Similar to the procedure of FIG. 9B, under the multitasking OS, the CPU performs the respective procedures of the transfer processing of the compressed data M1, the compressed data M2, and the non-compressed audio data A, and the sleep times of tM1, tM2, and tA time are set up respectively.

The frequency at which each transfer processing is performed for the unit time is changed by setting up the sleep times so that the conditions: $tM1<tM2<tA \leqq tV1$ are satisfied.

In the procedure of FIG. 9B, the sleep time tV1 when it is not the state of emergency and the sleep time tV2 when it is the state of emergency are set up so that the condition $tV1<<tV2$ is satisfied. By performing this setting, the frequency of transfer processing of the non-compressed video data V from the video-buffer region 18b to the external device is lowered to the state of emergency, and the priority of other data-transfer processings is relatively raised.

Figure 10A:
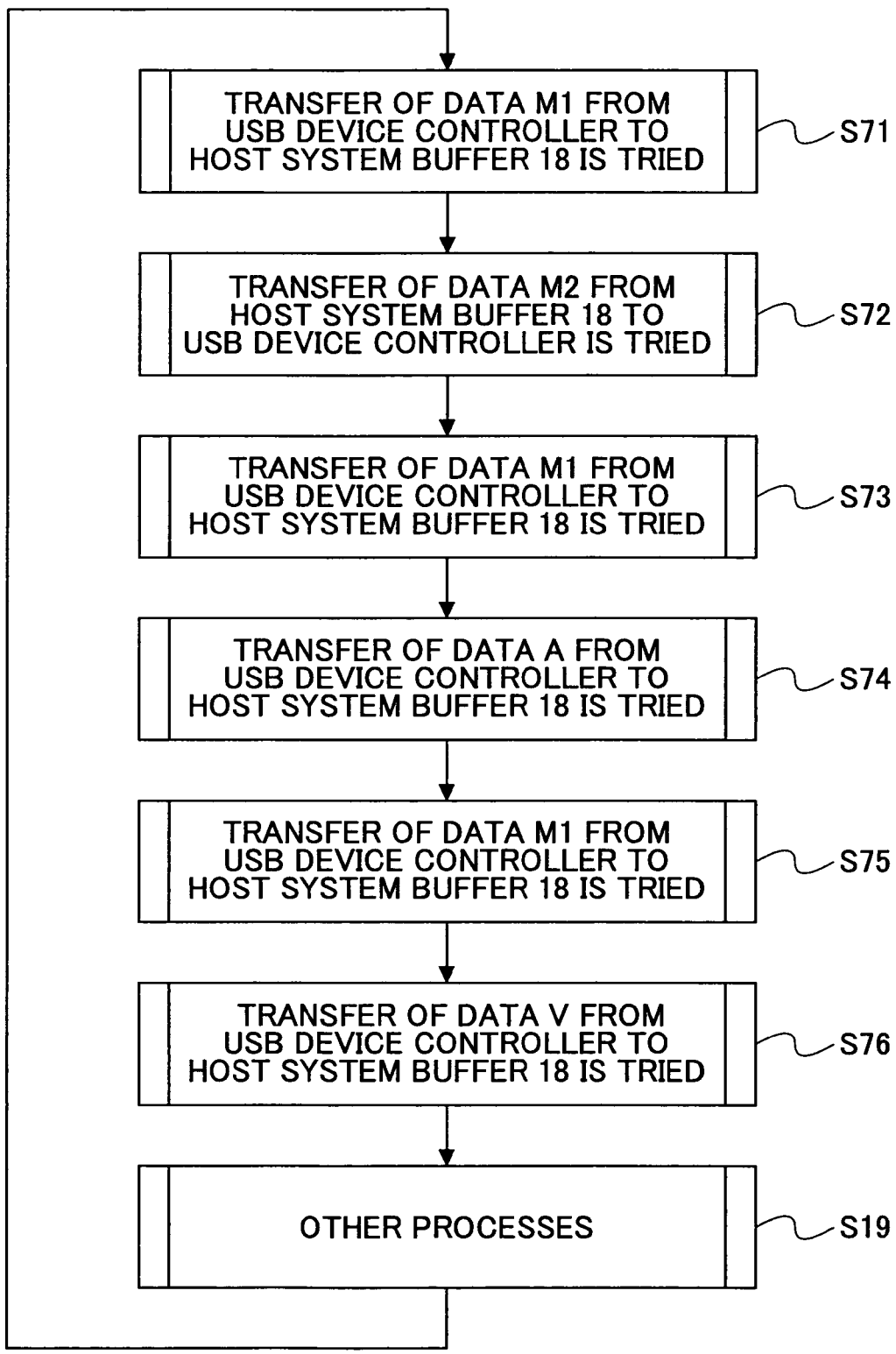
FIG. 10A is a flowchart for explaining other embodiments of the task scheduling method of the present invention.

FIG. 10A is the flowchart for explaining another embodiment of the task scheduling method of the present invention. The procedure of FIG. 10A is the method of adjusting the transfer priority at the time of transferring the compressed data M1, the non-compressed video data V, and the non-compressed audio data A, which are held on the side of the USB device controller 14, to the buffer 18 on the side of the host system.

In the procedure of FIG. 10A, the CPU at step S71 tries the transfer processing of the compressed data M1 to the buffer 18 on the side of the USB device controller 14 to the host system. As a feature of the USB interface, if the transfer is tried and a valid transfer data exists, then the ACK signal (acknowledge) is returned. If the transfer is tries and no valid transfer data exists, then the NAK signal (negative-acknowledge) is returned.

In step S72, the transfer processing of the compressed data M2 from the buffer 18 on the side of the host system to the USB device controller 14 side is tried.

In step S73, the CPU tries the transfer processing of the compressed data M1 from the USB device controller 14 to the buffer 18 on the side of the host system. In step S74, the CPU tries the transfer processing of the non-compressed audio data A from the side of the USB device controller 14 to the buffer 18 on the side of the host system. In step S75, the CPU tries the transfer processing of the compressed data M1 from the USB device controller 14 side to the buffer 18 on the side of the host system. In step S76, the CPU tries the transfer processing of the non-compressed video data V from the USB device controller 14 side to the buffer 18 on the side of the host system.

In step S19, the CPU performs other processing.

After step S19 is completed, the control is returned to the step S71, and the same procedure is repeated and performed.

Since the existence of the data is unknown beforehand, it has raised the transfer priority of the compressed data M1 in the procedure of FIG. 10A by increasing the number of tries which perform the transfer processing of the compressed data M1 as in the steps S71, S73, and S75.

The amount of data of the compressed data M1 of the method which determines whether the amount of data of M1 buffer region 18c of the buffer 18 by the side of the host system is over the threshold like the embodiment, and the internal buffer by the side of the USB device controller 14 it is also possible to use the method which suspends other data-transfer processings according to the excessive notice (the state of emergency).

Figure 10B:
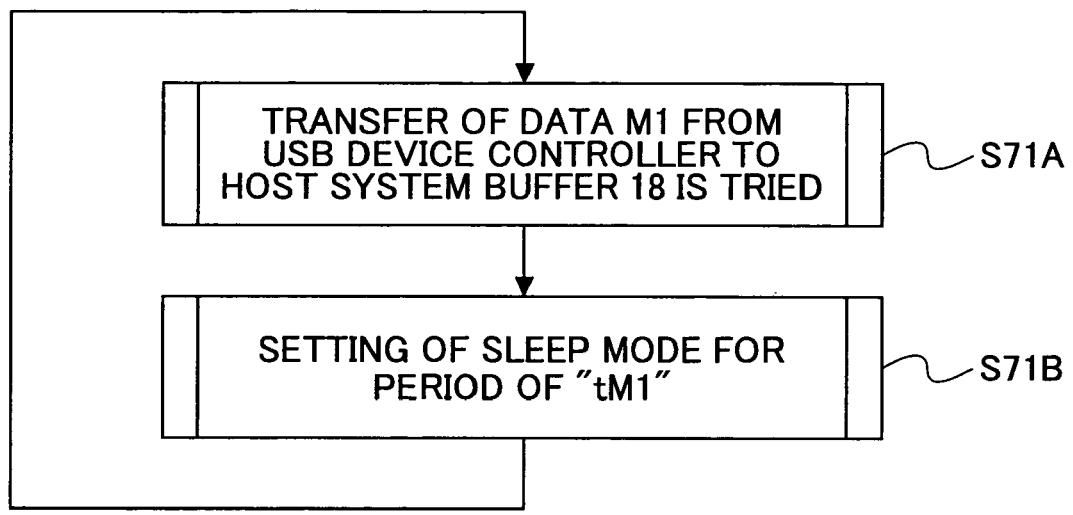
FIG. 10B is a flowchart for explaining the example which adjusts the transfer priority by changing sleep time in the case of the multitasking OS.

FIG. 10B is the flowchart for explaining the example in which the transfer priority is adjusted by changing the sleep time in the case of the multitasking OS.

In the procedure of FIG. 10B, the CPU at step S71A tries the transfer processing of the compressed data M1 from the USB device controller 14 side to the buffer 18 on the side of the host system.

In step S71B, the CPU sets the sleep time for the task of the transfer processing of the compressed data M1 to the sleep time tM1. When the sleep time tM1 set by the step S71B has elapsed, the control is returned to the step S71A and the same procedure is repeated and performed.

Similar to the procedure of FIG. 10B, under the control of the multitasking OS, the CPU performs the respective procedures of the transfer processing of the compressed data M2, the non-compressed audio data A, and the non-compressed video data V, and the sleep times of tM2, tA, and tV time are set up respectively.

The frequency at which each transfer processing is performed for the unit time can be varied by setting up the sleep times so that the conditions: $tM1<tM2<tA \leqq tV$ are satisfied.

Similar to the previous embodiment, the amount of data of the compressed data M1 of the method which determines whether the amount of data of M1 buffer region 18c of the buffer 18 by the side of the host system is over the threshold, and the internal buffer by the side of the USB device controller 14 it is also possible to use the method which suspends other data-transfer processings according to the excessive notice (the state of emergency)

Figure 11:
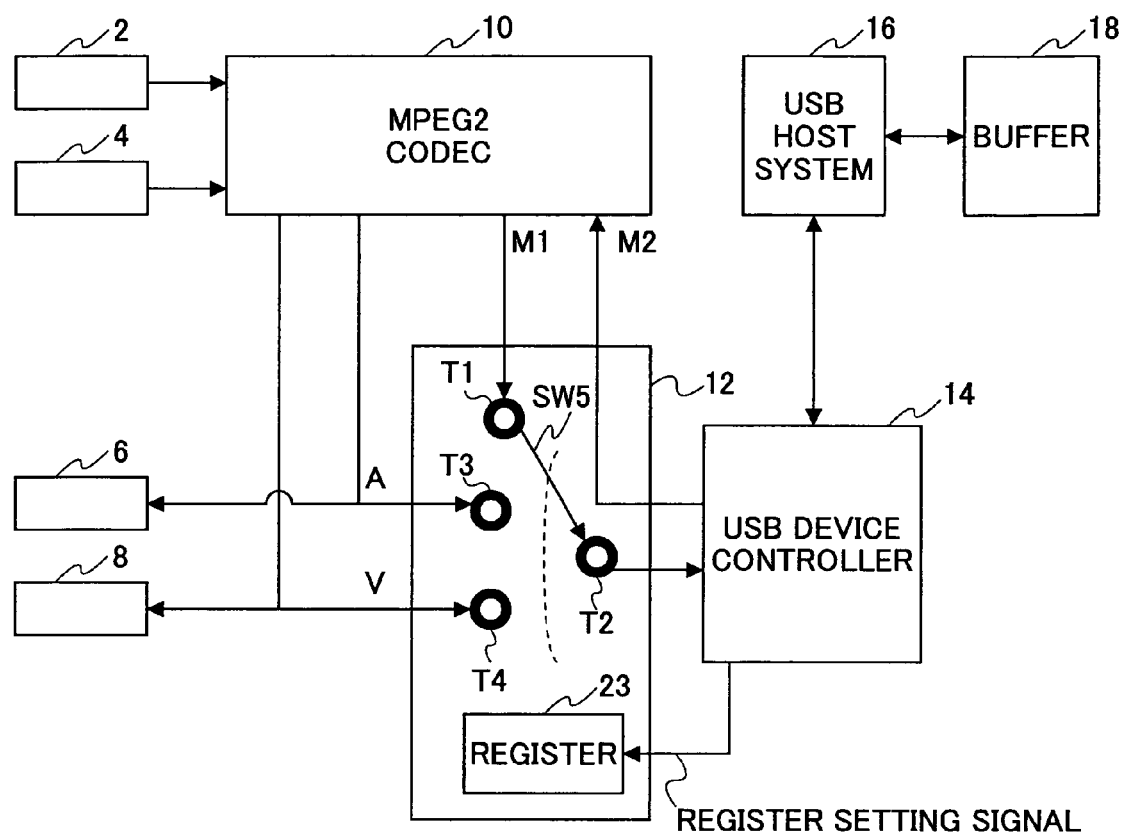
FIG. 11 is a diagram for explaining other embodiments of the task scheduling method of the present invention.

FIG. 11 is a diagram for explaining another embodiment of the task scheduling method of the present invention.

In the system of FIG. 1, it is possible to change each data-transfer priority by controlling the switch SW5 and the register 23 in the ASIC circuit 12 on the side of the data encoding/decoding apparatus.

The USB device controller 14 controls switching operation of the switch SW5 by outputting the register setting signal to the register 23.

As shown in FIG. 11, switching operation of the switch SW5 has the function to select one of the input terminal T1 of the compressed data M1 on the side of the MPEG2 CODEC 10, the input terminal T3 of the non-compressed audio data A and the input terminal T4 of the non-compressed video data V, and bring the selected input into conduction with the output terminal T2 on the side of the USB device controller 14.

The switching operation of the switch SW5 is performed based on the switching information outputted from the USB device controller 14 and held in the register 23. According to the register setting signal outputted from the USB device controller 14 to the register 23, the switching information is held in the register 23.

As the register setting modes of the register 23, there are various modes, including the mode in which the switch SW5 is changed periodically, the mode in which the transfer of the compressed data M1 is performed with high priority, and the mode in which the transfer of the compressed data M1 is performed with the highest priority.

Based on the switching information held in the register 23, it is determined which of the compressed data M1, the non-compressed audio data A, and the non-compressed video data V is transferred to the USB device controller 14. For example, if the switching operation of the switch SW5 makes continuity between the terminal T1 and the terminal T2 in the state where the transfer request of the compressed data M1 comes from the USB host system 16, the compressed data M1 is selected and transferred to the USB host system 16. At this time, the ACK signal is returned in response to the transfer request of the compressed data M1.

Moreover, if the switching operation of the switch SW5 makes continuity between the terminal T1 and the terminal T2 in the state where the respective transfer requests of the compressed data M1, the non-compressed audio data A, and the non-compressed video data V come equally from the USB host system 16, priority is given to the compressed data M1 and it is selected and transferred to the USB host system 16. At this time, in response to each transfer request of the non-compressed audio data A and the non-compressed video data V, the NAK signal is returned, and the transfer of these data is not performed. Consequently, priority is given to the transfer of the compressed data M1 on the side of the USB host system 16.

In addition, the composition which is not limited to controlling the register setup which changes the priority of data transfer from the host system side, but supervises the buffer in the device within the data encoding/decoding apparatus, and changes the priority of data transfer independently is also possible.

Figure 12C:
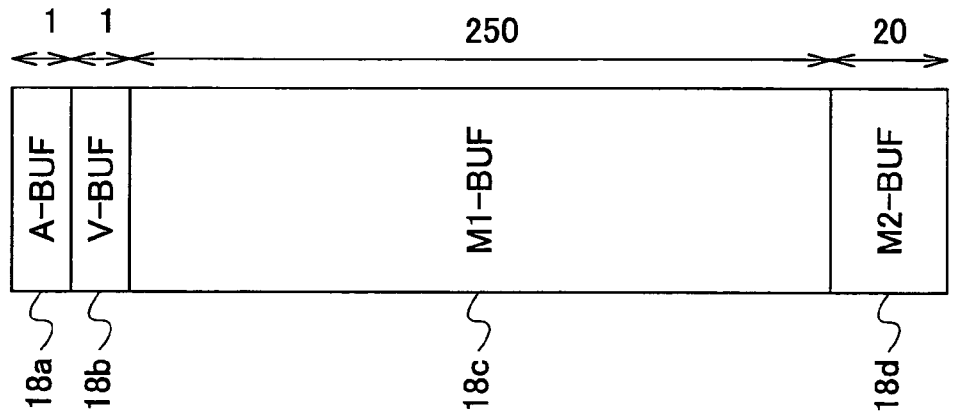
FIG. 12A, FIG. 12B, and FIG. 12C are diagrams for explaining the case where the area size for the compressed data of the buffer by the side of the host system is changed.
Figure 12B:
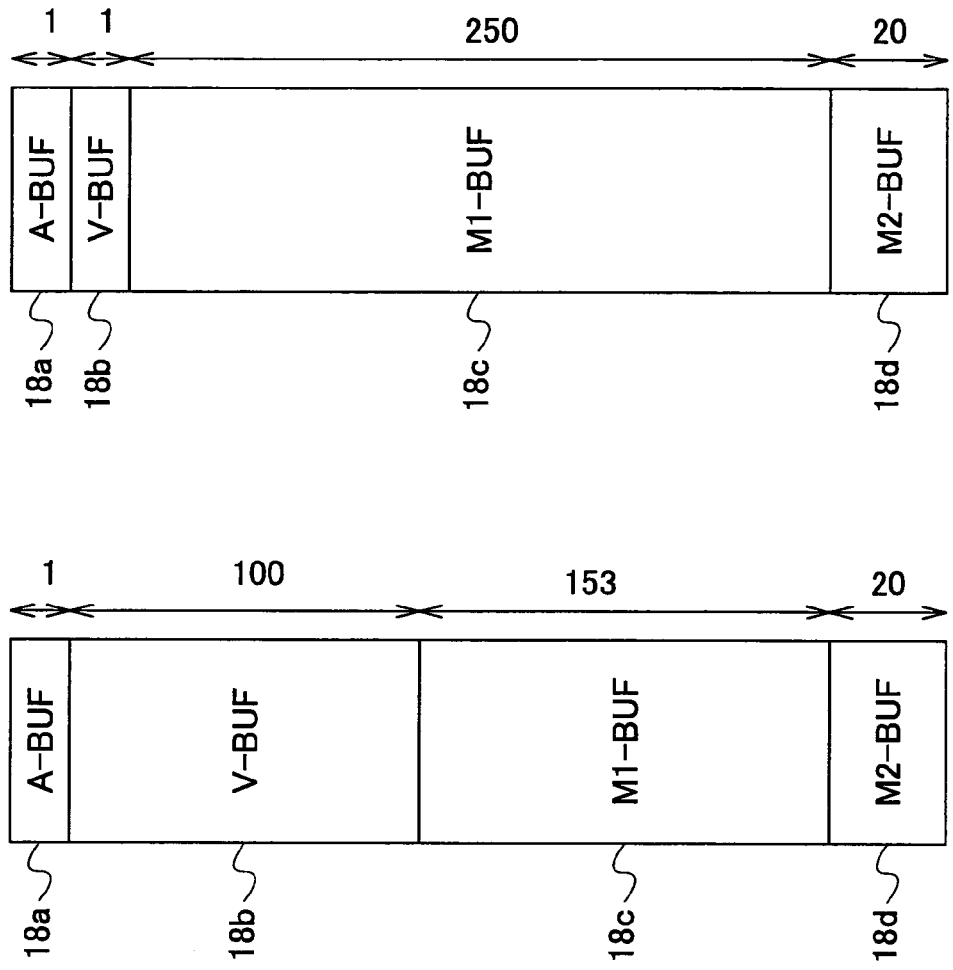
Figure 12A:
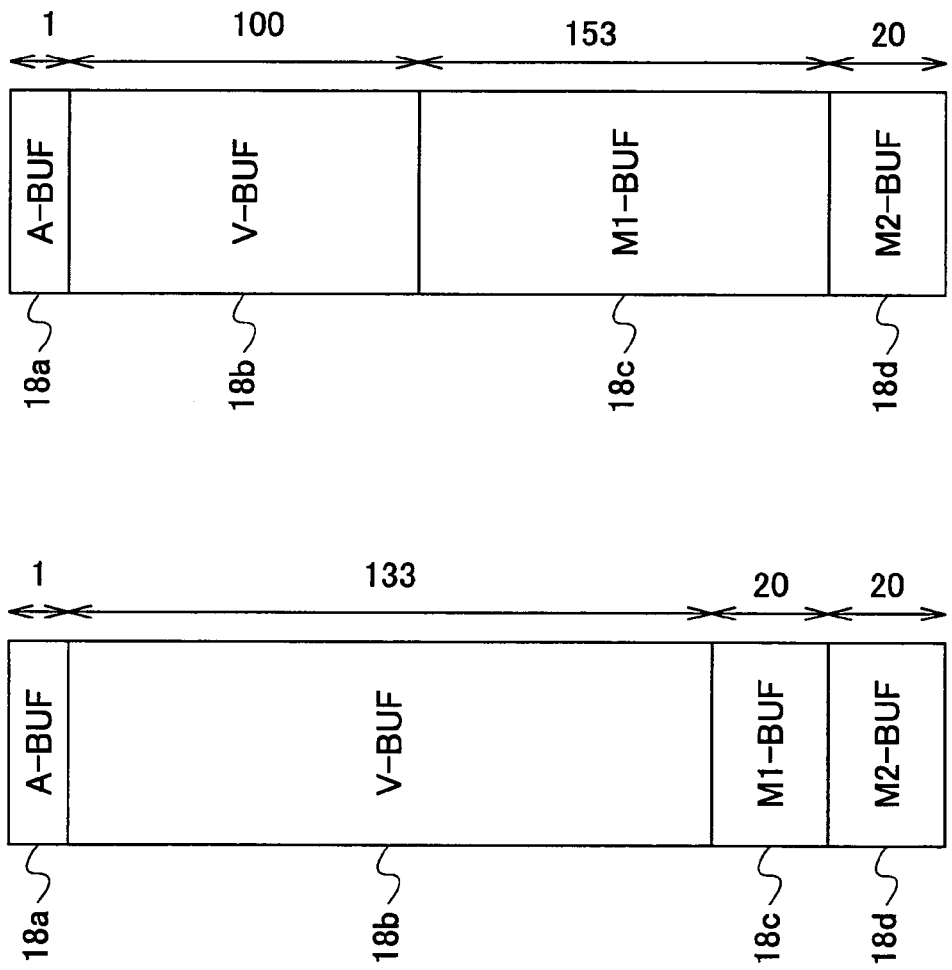

FIG. 12A, FIG. 12B, and FIG. 12C are diagrams for explaining the case where the area size for the compressed data of the buffer on the side of the host system is changed.

The size of each region in the buffer 18 on the side of the host system (PC) originally should be assigned according to the ratio of the amount of the data created per unit time, the buffer 18 comprising the audio buffer region 18a holding the non-compressed audio data A, the video-buffer region 18b holding the non-compressed video data V, the M1 buffer region 18c holding the compressed audio/video data M1 from the data encoding/decoding apparatus, and the M2 buffer region 18d holding the compressed audio/video data M2 from the external device.

Typically, the amount of the non-compressed video data V is about 200 Mbit/sec, the amount of the non-compressed audio data A is about 1.5 Mbit/sec, and the amount of the compressed data M1 and M2 which varies with the compression ratio is in the range of 1 to 30 Mbit/sec.

Therefore, if the size of the non-compressed audio data A in the normal state is set to 1, then the size of the non-compressed video data V is about 133 and the size of the compressed data M1 and M2 is about 20 respectively.

FIG. 12A shows the distribution of each region in the buffer 18 in the normal state.

However, the case where the processing transferred to HDD, external audio card, and external Video Card stagnates arises from the buffer 18 by load increase of other processings other than each data-transfer processing etc.

In such a case, the amount of data in the buffer 18 increases. The task scheduling method of each embodiment reduces (or temporarily stops) the frequency of transfer processing of the non-compressed video data V and the non-compressed audio data A, and it is giving priority to the transfer of the compressed data M1 to the external device from M1 buffer region 18c, and aims at preventing that the buffer 18 overflows.

However, as mentioned above, by load increase of other processings etc., when the predetermined area size (capacity) of M1 buffer region 18c is likely to be exceeded (state of emergency), by the task scheduling method of this embodiment, in the buffer 18, the area size of video-buffer region 18b with the lowest priority is decreased, and the part is used for making the area size of M1 buffer region 18c expand.

FIG. 12B shows the distribution of each region in the buffer 18 at the time of making the area size of M1 buffer region 18c expand in the state of emergency according to the task scheduling method of this embodiment. The numeric values of the area sizes shown in FIG. 12B, such as the area side of video-buffer region 18b: 100, or the area size of M1 buffer region 18c: 153, are given to show a typical example.

FIG. 12C shows size distribution of each region in the buffer 18 at the time of making the area size of M1 buffer region 18c expand further in the state of emergency according to the task scheduling method of this embodiment.

It is also possible to re-distribute that the numeric value shown in FIG. 12C also only shows an example, and sets area size of video-buffer region 18b to 0, audio buffer region 18a, and the M2 buffer region 18d to M1 buffer region 18c.

The hamper is possible in the mechanism in which similarly buffer overflow is avoided by expanding the data area for compressed data also about the buffer in the data encoding/decoding apparatus.

Figure 13A:
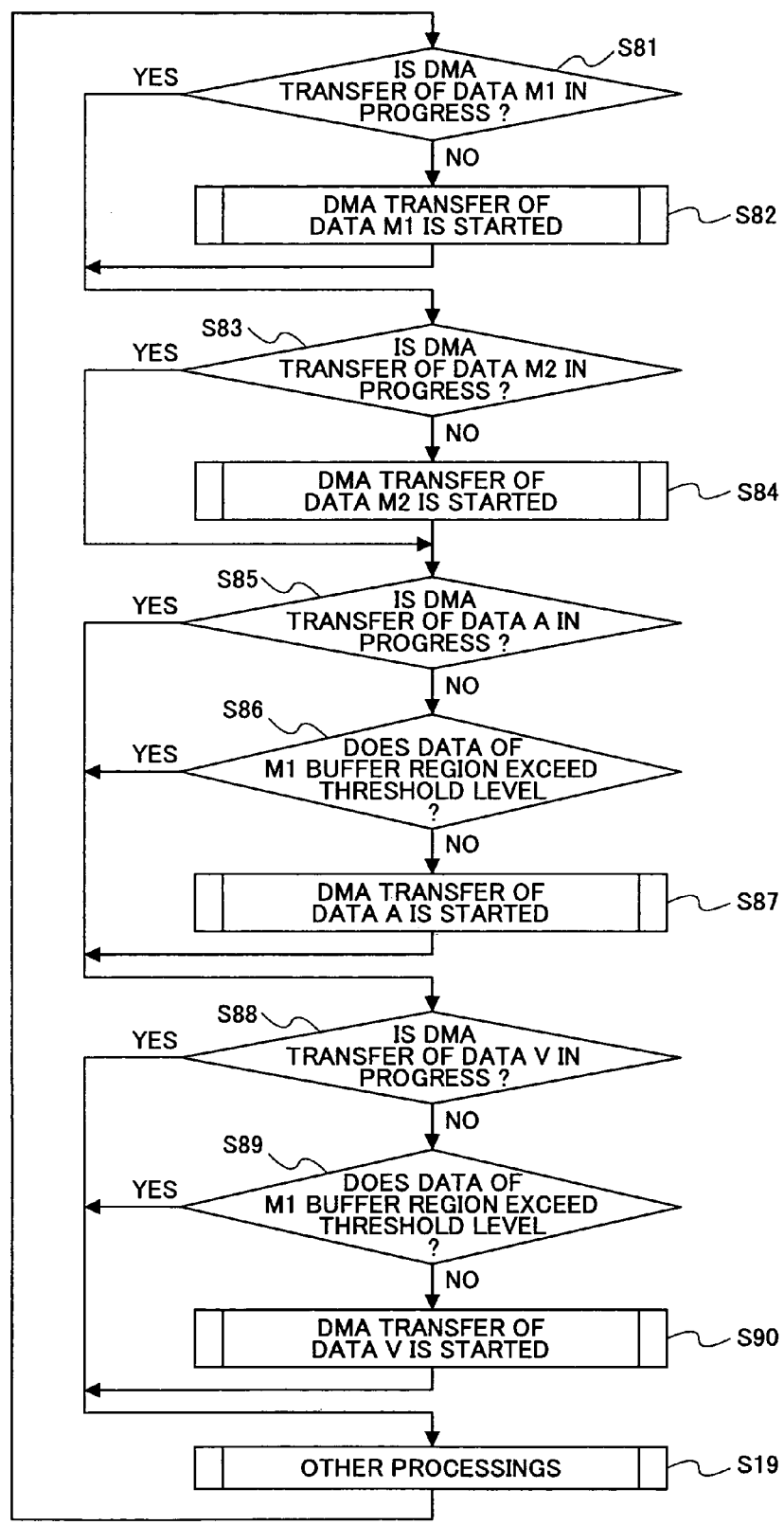
FIG. 13A is a flowchart for explaining the example at the time of applying to the system of FIG. 5.

FIG. 13A is the flowchart for explaining the example at the time of applying to the system of FIG. 5.

In the system of FIG. 5, although illustration is omitted, the PCI interface 36 has the bus master DMA (direct memory access), and the bus master DMA controls each transfer of the compressed data and the non-compressed data between the buffers 18 of the host system and the data encoding/decoding apparatus, without minding the CPU of the host system.

If the bus master DMA is started in the case of the system of FIG. 5 which used the PCI bus, it sets up so that it may wait for completion of DMA by polling or the task concerned may start according to interruption of completion of DMA, and the method which starts execution of other processings is applied.

The change method of the transfer priority of the task scheduling of this embodiment is the same as that of the case of the embodiment which used the USB bus fundamentally. the CPU of the host system performs procedure of FIG. 13A.

In the procedure of FIG. 13A, the CPU determines whether DMA is performing the transfer for the compressed data M1 of M1 buffer region 18c to the external hard disk drive (HDD) etc. in step S81.

When the determination result of step S11 is NO, the CPU starts DMA and makes the transfer to the hard disk drive of the data of M1 buffer region 18c etc. start in step S82. After the end of step S82 the control is transferred to step S83.

When the determination result of step S81 is YES, the following step S83 is performed without performing the step S82. In step S83, the CPU determines whether DMA is performing the transfer for the compressed data M2 from the outside to the M2 buffer region 18d.

When the determination result of step S83 is NO, the CPU starts DMA, reads the compressed data M2 from external HDD, and makes the transfer to the M2 buffer region 18d start in step S84. After the end of step S84 the control is transferred to step S85.

When the determination result of step S83 is YES, the following step S85 is performed without performing the step S84. In step S85, the CPU determines whether DMA is performing the transfer for the data A of audio buffer region 18*a* of the buffer 18 to external HDD.

When the determination result of step S85 is NO, in step S86, the CPU determines whether the amount of data of M1 buffer region 18*c* exceeds the predetermined threshold.

When the determination result of step S86 is NO, the CPU starts DMA and makes the transfer to HDD of the external device of the data A of audio buffer region 18*a* start in step S87. After the end of step S87 the control is transferred to step S88.

When the determination result of step S85 or step S86 is YES, the following step S88 is performed without performing the step S87. In step S88, the CPU determines whether DMA is performing the transfer for the data V of video-buffer region 18*b* of the buffer 18 to external HDD.

When the determination result of step S88 is NO, in step S89 the CPU determines whether the amount of data of M1 buffer region 18*c* exceeds the predetermined threshold.

When the determination result of step S89 is NO, the CPU starts DMA and makes the transfer to HDD of the external device of the data V of video-buffer region 18*b* start in step S90. After the end of step S90 the control is transferred to step S19.

When the determination result of step S88 or step S89 is YES, the following step S19 is performed without performing the step S90. In step S19, the CPU performs other processings except having described above.

After step S19 is completed, it returns to the step S81, and the same procedure is repeated and performed.

Figure 13B:
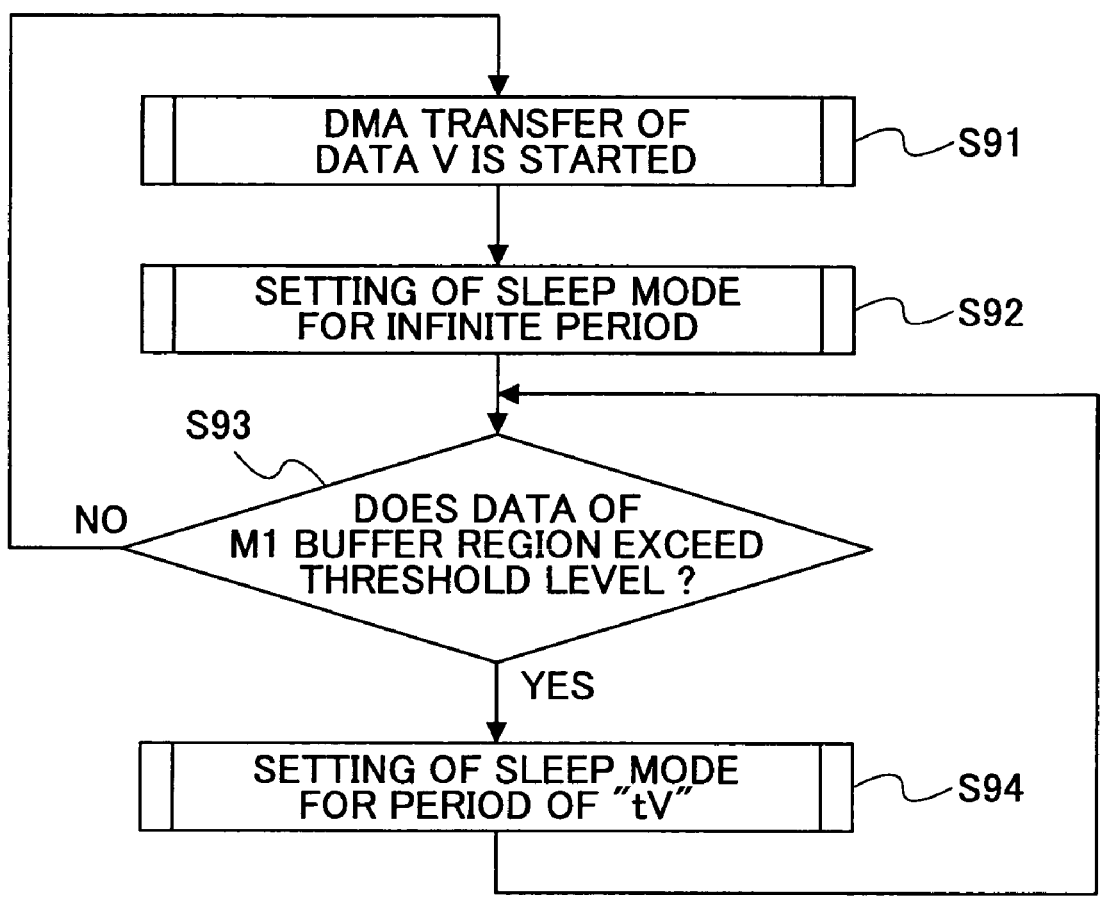
FIG. 13B is a flowchart for explaining the example which adjusts the transfer priority by changing sleep time in the case of the multitasking OS.

FIG. 13B is the flowchart for explaining the example which adjusts the transfer priority by changing sleep time in the case of the multitasking OS.

The procedure of FIG. 13B shows only the procedure of transfer processing of the non-compressed video data V. the CPU starts DMA and makes the transfer to HDD of the external device of the data V of video-buffer region 18*b* start in step S91 in the procedure of FIG. 13B.

In step S92, the CPU sets the infinite sleep time as the task of transfer processing of the non-compressed video data V. In step S93, the CPU determines whether the amount of data of M1 buffer region 18*c* exceeds the predetermined threshold.

When the determination result of step S93 is NO, it returns to the step S91, and the same procedure is repeated and performed. When the determination result of step S93 is YES, in step S94, the CPU is set as the task of transfer processing of the sleep time of tV time of the non-compressed video data V.

If the sleep time of tV time set up at step S93 passes, it will return to the step S93, and same procedure will be repeated and performed.

Like the procedure of FIG. 13B, under the multitasking OS, the CPU performs the procedure of each transfer processing of the compressed data M1, the compressed data M2, and the non-compressed audio data A, and sets up the sleep time of respectively infinite sleep time, infinite sleep time, and tA time.

At the procedure of this embodiment, only tA time and tV time lower the frequency of each transfer processing of the non-compressed audio data A and the non-compressed video data V, and raise the priority of transfer processing of the compressed data data M1 and M2 by delaying starting of DMA relatively.

The present invention is not limited to the above-described embodiments, and variations and modifications may be made without departing from the scope of the present invention.

What is claimed is:

1. A task scheduling method in case compressed data and non-compressed data are simultaneously transferred between a host system and a data encoding/decoding apparatus, comprising the steps of:

transferring a compressed audio/video data from a buffer of the host system to a first external device with a first transfer priority when the compressed audio/video data and a non-compressed audio/video data are simultaneously transferred;

transferring the non-compressed audio/video data from the buffer to a second external device with a second transfer priority lower than the first transfer priority when the compressed audio/video data and the non-compressed audio/video data are simultaneously transferred; and determining whether an amount of the compressed audio/video data held in the buffer of the host system after the transfer of the compressed audio/video data from the buffer of the host system to the first external device is completed exceeds a predetermined threshold, wherein, when the amount of the compressed audio/video data exceeds the predetermined threshold, the transfer of the non-compressed audio/video data from the buffer of the host system to the second external device is restricted or stopped.

2. The task scheduling method according to claim 1 further comprising the step of transferring the compressed audio/video data from the external device to the data encoding/decoding apparatus through the buffer with a third transfer priority that is lower than the first transfer priority and higher than the second transfer priority.

3. The task scheduling method according to claim 1 wherein the non-compressed audio/video data includes at least one of a non-compressed audio data and a non-compressed video data, and a transfer priority with which the non-compressed audio data is transferred from the buffer to the second external device is higher than a transfer priority with which the non-compressed video data is transferred from the buffer to the second external device.

4. A task scheduling method in case compressed data and non-compressed data are simultaneously transferred between a host system and a data encoding/decoding apparatus, comprising the steps of:

transferring a compressed audio/video data from a buffer of the host system to a first external device with a first transfer priority when the compressed audio/video data and a non-compressed audio/video data are simultaneously transferred;

transferring the non-compressed audio/video data from the buffer to a second external device with a second transfer priority lower than the first transfer priority when the compressed audio/video data and the non-compressed audio/video data are simultaneously transferred; and determining whether an amount of the compressed audio/video data held in a buffer of the data encoding/decoding apparatus after the transfer of the compressed audio/video data from the buffer of the host system to the first external device is completed exceeds a predetermined threshold, wherein when the amount of the compressed audio/video data exceeds the predetermined threshold, the transfer of the non-compressed audio/video data from the buffer of the host system to the second external device is restricted or stopped.

5. The task scheduling method according to claim 1 wherein the transfer of compressed data and non-compressed data between the host system and the data encoding/decoding apparatus is performed using a USB or IEEE 1394 serial bus.

6. The task scheduling method according to claim 1 wherein the transfer of compressed data and non-compressed data transfer between the host system and the data encoding/decoding apparatus is performed using a PCI parallel bus.

7. The task scheduling method according to claim 5 wherein a frequency at which the transfer of the compressed audio/video data from a buffer of the data encoding/decoding apparatus to the buffer of the host system is requested is set up to be larger than a frequency at which the transfer of the non-compressed audio/video data is requested so that the first transfer priority is made higher than the second transfer priority.

8. The task scheduling method according to claim 5 wherein switching operation of a switch provided in the data encoding/decoding apparatus is controlled so that the first transfer priority is made higher than the second transfer priority.

9. The task scheduling method according to claim 1 wherein when an amount of the compressed audio/video data held in a first region of the buffer of the host system exceeds a predetermined threshold, the first region is expanded and a second region of the buffer of the host system for holding the non-compressed audio/video data is reduced.

10. The task scheduling method according to claim 1 wherein a first sleep time which is set every time a predetermined amount of the compressed audio/video data is transferred from the buffer of the host system to the external device is made smaller than a second sleep time which is set every time a predetermined amount of the non-compressed audio/video data is transferred from the buffer to the external device, so that the first transfer priority is made higher than the second transfer priority.

11. A data processing device which simultaneously transfers compressed data and non-compressed data between a host system and a data encoding/decoding apparatus, comprising:
a first unit transferring a compressed audio/video data from a buffer of the host system to a first external device with a first transfer priority when the compressed audio/video data and a non-compressed audio/video data are simultaneously transferred;
a second unit transferring a non-compressed audio/video data from the buffer to a second external device with a second transfer priority lower than the first transfer priority when the compressed audio/video data and the non-compressed audio/video data are simultaneously transferred; and
a determination unit determining whether an amount of the compressed audio/video data held in the buffer of the host system after the transfer of the compressed audio/video data from the buffer of the host system to the first external device is completed by the first unit exceeds a predetermined threshold,
wherein, when the amount of the compressed audio/video data exceeds the predetermined threshold, the transfer of the non-compressed audio/video data from the buffer of the host system to the second external device by the second unit is restricted or stopped.

12. A data processing device comprising:
a transferring unit simultaneously transferring a compressed audio/video data and a non-compressed audio/video data between a host system and a data encoding/decoding apparatus;
a control unit changing a transfer priority of the transferring unit based on a state of a buffer of the data encoding/decoding apparatus or a command from the host system, in order to avoid overflowing of the compressed data in the buffer; and
a determination unit determining whether an amount of the compressed audio/video data held in the buffer of the host system after the transfer of the compressed audio/video data from the buffer of the host system to the first external device is completed by the transferring unit exceeds a predetermined threshold,
wherein a first transfer priority with which the compressed audio/video data is transferred is higher than a second transfer priority with which the non-compressed audio/video data is transferred, and
wherein, when the amount of the compressed audio/video data exceeds the predetermined threshold, the transfer of the non-compressed audio/video data from the buffer of the host system to the second external device by the transferring unit is restricted or stopped.

13. The data processing device according to claim 12 wherein when an amount of the compressed audio/video data held in a first region of the buffer of the data encoding/decoding apparatus exceeds a predetermined threshold, the first region is expanded and a second region of the buffer of the data encoding/decoding apparatus for holding the non-compressed audio/video data is reduced.

* * * * *